United States Patent
Miyazaki et al.

(10) Patent No.: US 9,517,759 B2
(45) Date of Patent: Dec. 13, 2016

(54) VEHICLE BRAKE CONTROL DEVICE

(71) Applicants: Tetsuya Miyazaki, Toyota (JP); Kazunori Nimura, Toki (JP)

(72) Inventors: Tetsuya Miyazaki, Toyota (JP); Kazunori Nimura, Toki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 36 days.

(21) Appl. No.: 14/438,417

(22) PCT Filed: Oct. 30, 2012

(86) PCT No.: PCT/JP2012/077996
§ 371 (c)(1),
(2) Date: Apr. 24, 2015

(87) PCT Pub. No.: WO2014/068660
PCT Pub. Date: May 8, 2014

(65) Prior Publication Data
US 2015/0291141 A1  Oct. 15, 2015

(51) Int. Cl.
*B60T 13/68* (2006.01)
*B60T 8/40* (2006.01)
(Continued)

(52) U.S. Cl.
CPC .............. *B60T 13/686* (2013.01); *B60T 7/042* (2013.01); *B60T 8/4081* (2013.01); *B60T 13/142* (2013.01);
(Continued)

(58) Field of Classification Search
CPC .... B60T 13/686; B60T 13/142; B60T 13/745; B60T 13/14; B60T 13/16; B60T 13/18; B60T 13/66; B60T 13/68
(Continued)

(56) References Cited

U.S. PATENT DOCUMENTS 6,186,602 B1* 2/2001 Jonner ................. B60T 8/3655
303/115.4
6,425,644 B2* 7/2002 Kawahata .............. B60T 8/367
303/113.3
(Continued)

FOREIGN PATENT DOCUMENTS

JP    2001-180472 A    7/2001
JP    2011-183921 A    9/2011

OTHER PUBLICATIONS

International Search Report issued Jan. 29, 2013 in PCT/JP2012/077996 filed Oct. 30, 2012.

*Primary Examiner* — Melanie Torres Williams
(74) *Attorney, Agent, or Firm* — Oblon, McClelland, Maier & Neustadt, L.L.P.

(57) ABSTRACT

A brake control device includes a front-wheel left-right communication passage that allows communication between wheel cylinders for a front-left wheel and a front-right wheel via a front-wheel communication on-off valve, and a rear-wheel left-right communication passage that allows communication between wheel cylinders for a rear-left wheel and a rear-right wheel via a rear-wheel communication on-off valve. The brake control device executes a hydraulic control by keeping the front-wheel communication on-off valve and the rear-wheel communication on-off valve opened. The front-wheel communication on-off valve is a normally closed type, and the rear-wheel communication on-off valve is a normally opened type.

4 Claims, 16 Drawing Sheets

(51) Int. Cl.
*B60T 7/04* (2006.01)
*B60T 13/14* (2006.01)
*B60T 13/66* (2006.01)
B60T 8/34 (2006.01)
B60T 8/36 (2006.01)

(52) U.S. Cl.
CPC ............ *B60T 13/147* (2013.01); *B60T 13/662* (2013.01); *B60T 8/348* (2013.01); *B60T 8/367* (2013.01)

(58) Field of Classification Search
USPC .................... 303/10, 15, 186, DIG. 6, 116.1
See application file for complete search history.

(56) References Cited

U.S. PATENT DOCUMENTS

| | | |
|---|---|---|
| 2001/0006306 A1 | 7/2001 | Kagawa et al. |
| 2002/0079736 A1 | 6/2002 | Soga |
| 2006/0202551 A1* | 9/2006 | Gottwick .............. B60T 8/4081 303/116.1 |

* cited by examiner

VEHICLE BRAKE CONTROL DEVICE

TECHNICAL FIELD

The present invention relates to a vehicle brake control device that can independently control a hydraulic pressure of each of front-left, front-right, rear-left, and rear-right wheels by using a linear control valve.

BACKGROUND ART

Conventionally, as proposed in Patent Document 1, there has been known a vehicle brake control device including linear control valves (composed of a pressure-increasing linear control valve and a pressure-decreasing linear control valve), each of which is provided on an individual passage for operating fluid from a power hydraulic pressure generating device to each wheel cylinder, the brake control device independently controlling a hydraulic pressure of a wheel cylinder for each wheel according to an energization control of the linear control valves.

The brake control device proposed in Patent Document 1 includes a pedal effort brake system in which the wheel cylinders for the front-left and front-right wheels are respectively connected to a master cylinder via two master passages to independently supply a hydraulic pressure, which is generated by a depressing operation on a brake pedal, to the wheel cylinders for the front-left and front-right wheels. A master cutoff valve that is a normally opened solenoid valve is provided to each of two master passages. During a hydraulic control, two master cutoff valves are kept closed, and after the hydraulic control is ended, energization of these master cutoff valves is stopped, so that they are kept opened. Accordingly, this brake control device is configured to be capable of generating braking force on the front-left and front-right wheels with the pedal effort brake system by using pedal effort on the brake pedal inputted by a driver, even if abnormality occurs on an electric system.

Patent Document 1 also proposes a brake control device including a front-wheel left-right communication passage that allows communication between wheel cylinders for front-left and front-right wheels and a rear-wheel left-right communication passage that allows communication between wheel cylinders for rear-left and rear-right wheels, wherein the front-wheel left-right communication passage and the rear-wheel left-right communication passage are provided with a normally opened solenoid on-off valve. In this brake control device, when abnormality occurs on an electric system, energization of the normally opened solenoid on-off valves on two communication passages is stopped, whereby the wheel cylinders for the front-left and front-right wheels are communicated with each other, and the wheel cylinders for the rear-left and rear-right wheels are communicated with each other.

PRIOR ART DOCUMENT

Patent Document

Patent Document 1: Japanese Patent Application Laid-Open (kokai) No. 2011-183921

SUMMARY OF THE INVENTION

There is a problem of an operating noise of a linear control valve that provides uncomfortable feeling to a driver. This operating noise is generated due to a hydraulic pulsation that occurs at the moment the linear control valve is opened. Especially, the brake control device that can independently control hydraulic pressures of wheel cylinders for front-left, front-right, rear-left, and rear-right wheels includes four pressure-increasing linear control valves and four pressure-decreasing linear control valves. These linear control valves are individually activated, resulting in that much operating noise is generated. The occurrence of an operating noise described above can be reduced, if a communication passage that allows communication between the wheel cylinders for the left and right wheels is provided, and the hydraulic pressures of the wheel cylinders for the left and right wheels are commonly controlled by using the linear control valve for the other one of the left and right wheels with the linear control valve for one of the left and right wheels being deactivated. However, the configuration proposed in Patent Document 1 in which a normally opened solenoid on-off valve is provided on both of the front-wheel left-right communication passage and the rear-wheel left-right communication passage has a room for improvement in solving a problem caused by a leakage of operating fluid as well as reducing power consumption.

In the configuration having the normally opened solenoid on-off valve on the front-wheel left-right communication passage, when a leakage of operating fluid (leakage to the outside) occurs on a pedal effort brake system for either one of the front-left and front-right wheels, operating fluid in the pedal effort brake system for the other one of the front-left and front-right wheels is gradually flown into the pedal effort brake system having the leakage of operating fluid via the front-wheel left-right communication passage even during a period in which a vehicle is not used (a period in which an ignition switch is turned off). Therefore, the amount of operating fluid is reduced in both the pedal effort brake system for the front-left wheel and the pedal effort brake system for the front-right wheel, if the period in which the vehicle is not used is increased, though the degree of the leakage of the operating fluid is very small.

The present invention is accomplished to solve the above problem, and aims to solve a problem caused by a leakage of operating fluid as well as reduce power consumption.

According to an aspect of the present invention for solving the above problem, a vehicle brake control device includes: wheel cylinders (82), each of which is provided to each of front-left, front-right, rear-left, and rear-right wheels for receiving a hydraulic pressure of operating fluid to apply braking force to the wheels; a power hydraulic pressure generating device (30) that generates a hydraulic pressure even if a brake operation is not performed; individual linear control valve devices (50), each of which is provided to an individual passage (43) of operating fluid leading into each of the wheel cylinders from the power hydraulic pressure generating device for independently adjusting a hydraulic pressure of each of the wheel cylinders; a master cylinder (20) that generates a first pedal effort hydraulic pressure and a second pedal effort hydraulic pressure by using a pedal effort caused by a driver's depressing operation on a brake pedal; a master hydraulic path including a first pedal effort hydraulic pressure path (23) that supplies the first pedal effort hydraulic pressure to the wheel cylinder for either one of the front-left and front-right wheels, and a second pedal effort hydraulic pressure path (24) that supplies the second pedal effort hydraulic pressure to the wheel cylinder for the other front wheel; a master cut valve device that includes a first on-off valve (46) opening and closing the first pedal effort hydraulic path, and a second on-off valve (47) opening and closing the second pedal effort hydraulic path, the first on-off valve and the second on-off valve being a normally opened valve that keeps opened upon non-energization and is closed due to energization; and a hydraulic control unit (100) that controls energization of the individual linear control valve devices to control the hydraulic pressure of each of the wheel cylinders with the first on-off valve and the second on-off valve of the master cut valve device closed, the brake control device including: a front-wheel left-right communication passage (61) that allows communication between the individual passage (43FL), which is located between the wheel cylinder for the front-left wheel and the individual linear control valve device, and the individual passage (43FR), which is located between the wheel cylinder for the front-right wheel and the individual linear control valve device, via a front-wheel communication on-off valve (64);

a rear-wheel left-right communication passage (62) that allows communication between the individual passage (43RL), which is located between the wheel cylinder for the rear-left wheel and the individual linear control valve device, and the individual passage (43RR), which is located between the wheel cylinder for the rear-right wheel and the individual linear control valve device, via a rear-wheel communication on-off valve (65); and a communication control unit (S13) that allows the front-wheel communication on-off valve and the rear-wheel communication on-off valve to be opened during a hydraulic control by the hydraulic control unit, wherein the front-wheel communication on-off valve is a normally closed valve that keeps closed upon non-energization and is opened due to energization, and the rear-wheel communication on-off valve is a normally opened valve that keeps opened upon non-energization and is closed due to energization.

The present invention includes a power hydraulic pressure generating device that generates a high hydraulic pressure even if a brake operation is not performed, and a master cylinder that generates a first pedal effort hydraulic pressure and a second pedal effort hydraulic pressure with a pedal effort caused by a driver's depressing operation on a brake pedal. The hydraulic pressure generated from the power hydraulic pressure generating device is adjusted by each of the individual linear control valve devices, and then, supplied to the wheel cylinders for four wheels. On the other hand, the first pedal effort hydraulic pressure and the second pedal effort hydraulic pressure generated from the master cylinder are respectively supplied to the wheel cylinder for one of the front-left and front-right wheels and the wheel cylinder for the other one of the front-left and front-right wheels via the first pedal effort hydraulic pressure path and the second pedal effort hydraulic pressure path. The first pedal effort hydraulic pressure path and the second pedal effort hydraulic pressure path are respectively provided with a normally-opened first on-off valve and a second on-off valve. The hydraulic control unit controls energization of the individual linear control valve devices to control the hydraulic pressure of each of the wheel cylinders with the first on-off valve and the second on-off valve of the master cut valve device closed. For example, the hydraulic control unit acquires detected hydraulic pressures of the wheel cylinders, and controls energization of the individual linear control valve devices such that the detected hydraulic pressures follow a target hydraulic pressure. When abnormality occurs in the brake control device, the first on-off valve and the second on-off valve can be opened even if this abnormality is caused by an electric system. Therefore, even if a hydraulic control by the hydraulic control unit cannot be performed, braking force can be generated on the front-left and front-right wheels by using pedal effort on the brake pedal inputted by a driver.

The present invention also includes the front-wheel left-right communication passage that allows communication between the wheel cylinders for the front-left and front-right wheels, and the rear-wheel left-right communication passage that allows communication between the wheel cylinders for the rear-left and rear-right wheels. The front-wheel left-right communication passage allows the communication between the individual passage, which is located between the wheel cylinder for the front-left wheel and the individual linear control valve device, and the individual passage, which is located between the wheel cylinder for the front-right wheel and the individual linear control valve device, via the front-wheel communication on-off valve. The "individual passage located between the wheel cylinder for the front-left wheel and the individual linear control valve device" means the individual passage located between the wheel cylinder for the front-left wheel and the individual linear control valve device for adjusting the hydraulic pressure of the wheel cylinder for the front-left wheel. The same applies to the individual passages between the wheel cylinders for the other wheels and the individual linear control valve device.

The rear-wheel left-right communication passage allows the communication between the individual passage, which is located between the wheel cylinder for the rear-left wheel and the individual linear control valve device, and the individual passage, which is located between the wheel cylinder for the rear-right wheel and the individual linear control valve device, via the rear-wheel communication on-off valve.

The communication control unit opens the front-wheel communication on-off valve and the rear-wheel communication on-off valve during the hydraulic control by the hydraulic control unit. During a normal brake control (hydraulic control) in which target hydraulic pressures of the wheel cylinders for the left and right wheels are set to be the same value, when the wheel cylinders for the respective wheels are communicated with one another, all of the individual linear control valve devices are not necessarily activated, and some of them can be deactivated. As a result, an occurrence of an operating noise from the individual linear control valve devices can be reduced. In addition, if some of the individual linear control valve devices are in failure, the hydraulic control can be continued by using the individual linear control valve device that is not in failure.

The front-wheel communication on-off vale is a normally closed valve that keeps closed upon non-energization and is opened due to energization. Accordingly, when the brake control device is not started, or when the hydraulic control cannot be performed due to abnormality generated in the brake control device, the front-wheel communication on-off valve can surely keep closed. This configuration can prevent the first pedal effort hydraulic pressure path and the second pedal effort hydraulic pressure path, which respectively supply the pedal effort hydraulic pressure to the wheel cylinders for the front-left and front-right wheels, from being communicated with each other. Therefore, even if a leakage of operating fluid (leakage to the outside) occurs on the pedal effort hydraulic pressure path or the wheel cylinder for either one of the left and right wheels, the operating fluid in the other pedal effort hydraulic pressure path is not flown into the pedal effort hydraulic pressure path, on which the leakage of operating fluid occurs, via the front-wheel left-right communication passage. Thus, the brake control device can maintain a state in which braking force can be generated to one front wheel. Especially since the front wheels more largely contribute to braking than rear wheels, it is extremely effective to maintain the state in which the wheel having no leakage of operating fluid can be stopped.

On the other hand, the rear-wheel communication on-off valve is a normally opened valve that keeps opened upon non-energization and is closed due to energization. Therefore, power is not consumed during the hydraulic control. Even if a leakage of operating fluid (leakage to the outside) occurs on the wheel cylinder or the individual passage of either one of the rear-left and rear-right wheels, operating fluid is not supplied to the wheel cylinders for the respective wheels from the power hydraulic pressure generating device when the brake control device is not started or when the hydraulic control is not performed. Therefore, the amount of the leaked operating fluid is small, whether the rear-wheel communication on-off valve is opened or closed. In addition, the leaked amount of operating fluid is not affected by the open/close state of the rear-wheel communication on-off valve during the hydraulic control.

From this, in the present invention, the front-wheel communication on-off valve is a normally closed valve, and the rear-wheel communication on-off valve is a normally opened valve. With this configuration, the present invention can solve a problem caused by a leakage of operating fluid as well as reduce power consumption.

According to another aspect of the present invention, the brake control device further includes a front-rear communication passage (63) that allows communication between the individual passage (43FR), which is located between the wheel cylinder of either one of the front-left and front-right wheels and the individual linear control valve device, and the individual passage (43RL), which is located between the wheel cylinder of either one of the rear-left and rear-right wheels and the individual linear control valve device, via a front-rear communication on-off valve (66), wherein the front-rear communication on-off valve (66) is a normally closed valve that keeps closed upon non-energization and is opened due to energization, and the communication control unit (S13) opens the front-wheel communication on-off valve, the rear-wheel communication on-off valve, and the front-rear communication on-off valve during the hydraulic control by the hydraulic control unit.

The present invention includes the front-rear communication passage in addition to the front-wheel left-right communication passage and the rear-wheel left-right communication passage. The front-rear communication passage allows the communication between the individual passage, which is located between the wheel cylinder of either one of the front-left and front-right wheels and the individual linear control valve device, and the individual passage, which is located between the wheel cylinder of either one of the rear-left and rear-right wheels and the individual linear control valve device, via the front-rear communication on-off valve. The communication control unit opens the front-wheel communication on-off valve, the rear-wheel communication on-off valve, and the front-rear communication on-off valve during the hydraulic control by the hydraulic control unit. With this configuration, the wheel cylinders for the front-left, front-right, rear-left, and rear-right wheels are controlled to have the same hydraulic pressure as being communicated with one another. According to this configuration, the degree of freedom of selecting an individual linear control valve device to be activated is increased, whereby an occurrence of an operating noise from the individual linear control valve devices can further be reduced. In addition, capability to cope with failure in the individual linear control valve devices can be enhanced.

The front-rear communication on-off vale (66) is a normally closed valve that keeps closed upon non-energization and is opened due to energization. Accordingly, when the brake control device is not started, or when the hydraulic control cannot be performed due to abnormality generated in the brake control device, the front-rear communication on-off valve can surely keep closed. With this, the pedal effort hydraulic pressure path for the front wheels can surely be separated from the hydraulic pressure path for the rear wheels. Accordingly, even if abnormality occurs on the passage of operating fluid for the wheel cylinders for the rear wheels, this abnormality does not affect the pedal effort hydraulic pressure path for the front wheels. Thus, the brake control device can maintain a state in which a pedal effort hydraulic pressure can be supplied to the wheel cylinders for the front wheels that largely contribute to braking.

According to another aspect of the present invention, the hydraulic control unit deactivates some of the individual linear control valve devices, and activates the remaining individual linear control valve devices during the normal brake control, upon controlling the hydraulic pressure of each wheel cylinder.

In the present invention, the wheel cylinders for the left and right wheels are communicated with each other during the hydraulic control. Alternatively, the wheel cylinders for the front-left, front-right, rear-left, and rear-right wheels are communicated with one another. Therefore, the hydraulic pressure of each wheel cylinder can be increased or decreased by activating the individual linear control valve devices in the number less than the number of the wheel cylinders. In view of this, in the present invention, the hydraulic control unit deactivates some of the individual linear control valve devices, and activates the remaining individual linear control valve devices to control the hydraulic pressures of the respective wheel cylinders. This configuration can reduce the generation of operating noise from the individual linear control valve devices. In addition, since the number of the wheel cylinders to be controlled is increased relative to the number of the individual linear control valve devices to be activated, the amount of the operating fluid absorbing the pulsation generated in the operating fluid upon opening the valves increases, whereby the loudness of the operating noise ca be reduced. Consequently, quietness during the hydraulic control can be enhanced.

Even if some of the individual linear control valve devices are in failure, the hydraulic control can be continued by using the individual linear control valve devices that are not in failure. Therefore, capability to cope with failure of the individual linear control valve devices can be enhanced. In the case where each of the individual linear control valve devices is composed of a pressure-increasing linear control valve and a pressure-decreasing linear control valve, the situation in which "some of the individual linear control valve devices are deactivated" means the configuration in which some of the pressure-increasing linear control valves are deactivated, the configuration in which some of the pressure-decreasing linear control valves are deactivated, and the configuration in which some of the pressure-increasing linear control valves and some of the pressure-decreasing linear control valves are deactivated.

In the above description, the reference numerals used in the embodiments are added in parentheses to the respective corresponding components in the embodiments, in order to facilitate understanding of the present invention. However, the respective constituents of the present invention are not intended to be limited to the components specified by the reference numerals in the embodiments.

BEST MODE FOR CARRYING OUT THE INVENTION

Figure 1:
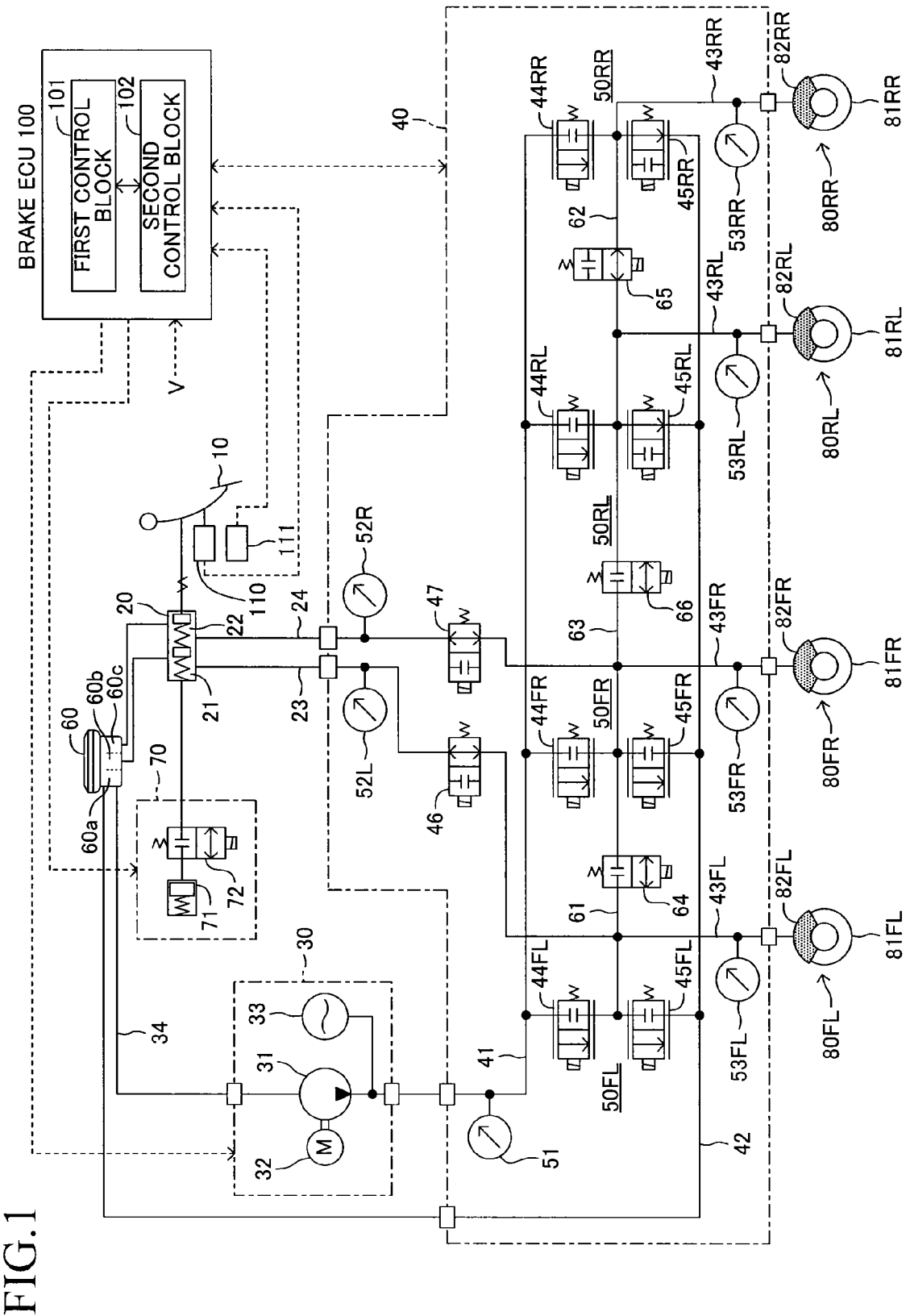
FIG. 1 is a diagram illustrating a schematic system configuration of a vehicle brake control device according to an embodiment of the present invention.

A vehicle brake control device according to one embodiment of the present invention will be described below with reference to the accompanying drawings. FIG. 1 is a diagram illustrating a schematic system configuration of a vehicle brake control device according to the embodiment of the present invention.

The brake control device according to the present embodiment includes a brake pedal 10, a master cylinder 20, a power hydraulic pressure generating device 30, a brake actuator 40, a reservoir 60, a stroke simulator device 70, disk brake units 80FL, 80FR, 80RL, and 80RR, each of which is provided to each wheel, and a brake ECU 100 serving as an electronic control device performing a brake control.

The disk brake units 80FL, 80FR, 80RL, and 80RR respectively include brake disks 81FL, 81FR, 81RL, and 81RR, and wheel cylinders 82FL, 82FR, 82RL, and 82RR incorporated in brake calipers. The wheel cylinders 82FL, 82FR, 82RL, and 82RR are connected to the brake actuator 40, and they press a brake pad against the brake disks 81FL, 81FR, 81RL, and 81 RR, which rotate with wheels, by hydraulic pressure of the operating fluid (brake fluid) supplied from the brake actuator 40 to apply braking force to the wheels.

The master cylinder 20 includes two pressure chambers 21 and 22. The pressure chambers 21 and 22 are connected to the wheel cylinders 82FL and 82FR for the front wheels by master passages 23 and 24. When the brake pedal 10 is depressed, a pressure piston advances forward to increase the pressure of the operating fluid, and the master cylinder 20 transmits the increased hydraulic pressure (master cylinder pressure) to the wheel cylinders 82FL and 82FR. The reservoir 60 is connected to the pressure chambers 21 and 22 in the master cylinder 20. The reservoir 60 stores operating fluid with the atmospheric pressure. The master cylinder 20 is configured to allow the flow of the operating fluid from the reservoir 60 to the pressure chambers 21 and 22 when the pressure piston moves backward, while it is configured to inhibit the flow of the operating fluid in the opposite direction when the pressure piston moves forward.

The reservoir 60 is divided into three storage chambers 60a, 60b, and 60c, and these three storage chambers 60a, 60b, and 60c store operating fluid. The storage chamber 60a corresponds to the power hydraulic pressure generating device 30, and this is a storage chamber of operating fluid supplied to the power hydraulic pressure generating device 30. The storage chamber 60b corresponds to the pressure chamber 21, and this is a storage chamber of operating fluid supplied to the master passage 23. The storage chamber 60c corresponds to the pressure chamber 22, and this is a storage chamber of operating fluid supplied to the master passage 24.

The stroke simulator device 70 is connected to the pressure chamber 21 in the master cylinder 20. The stroke simulator device 70 includes a stroke simulator 71 and a simulator cut valve 72. The simulator cut valve 72 is a normally closed solenoid valve that keeps closed by biasing force of a spring when a solenoid is not energized, but is opened only when the solenoid is energized. When the simulator cut valve 72 is closed, the flow of the operating fluid between the pressure chamber 21 and the stroke simulator 71 is cut off. When the simulator cut valve 72 is opened, the flow of the operating fluid between the pressure chamber 21 and the stroke simulator 71 is allowed in both directions.

The stroke simulator 71 includes plural pistons and springs. When the simulator cut valve 72 is opened, the stroke simulator 71 takes inside the operating fluid in an amount according to a brake operation amount to enable a stroke operation of the brake pedal 10, and generates reaction force according to a pedal operation amount to allow a driver to feel a satisfactory brake operation sense.

The power hydraulic pressure generating device 30 is a device that generates a high hydraulic pressure even if a brake operation is not performed. The power hydraulic pressure generating device 30 includes a pump 31 that sucks operating fluid from the reservoir 60 via an intake passage 34, a motor 32 that drives the pump 31, and an accumulator 33. The accumulator 33 converts pressure energy of the operating fluid pressurized by the pump 31 into pressure energy of sealed gas such as nitrogen, and stores the resultant energy. The power hydraulic pressure generating device 30 is connected to the brake actuator 40, and supplies the pressurized operating fluid to the brake actuator 40.

The brake actuator 40 includes an accumulator passage 41 into which the pressurized operating fluid is supplied from the power hydraulic pressure generating device 30, a return passage 42 connected to the reservoir 60, and four individual passages 43FL, 43FR, 43RL, and 43RR connected to each of the wheel cylinders 82FL, 82FR, 82RL, and 82RR. The brake actuator 40 also includes pressure-increasing linear control valves 44FL, 44FR, 44RL, and 44RR, and connects the individual passages 43FL, 43FR, 43RL, and 43RR to the accumulator passage 41 via the pressure-increasing linear control valves 44FL, 44FR, 44RL, and 44RR. The brake actuator 40 also includes pressure-decreasing linear control valves 45FL, 45FR, 45RL, and 45RR, and connects the individual passages 43FL, 43FR, 43RL, and 43RR to the return passage 42 via the pressure-decreasing linear control valves 45FL, 45FR, 45RL, and 45RR.

The components provided for each wheel are represented such that FL for the front-left wheel, FR for the front-right wheel, RL for the rear-left wheel, and RR for the rear-right wheel are written at the end of the corresponding reference numeral. However, the reference symbols at the end are omitted, when it is unnecessary to specify any one of the components for the front-left, front-right, rear-left, and rear-right wheels.

Figure 5:
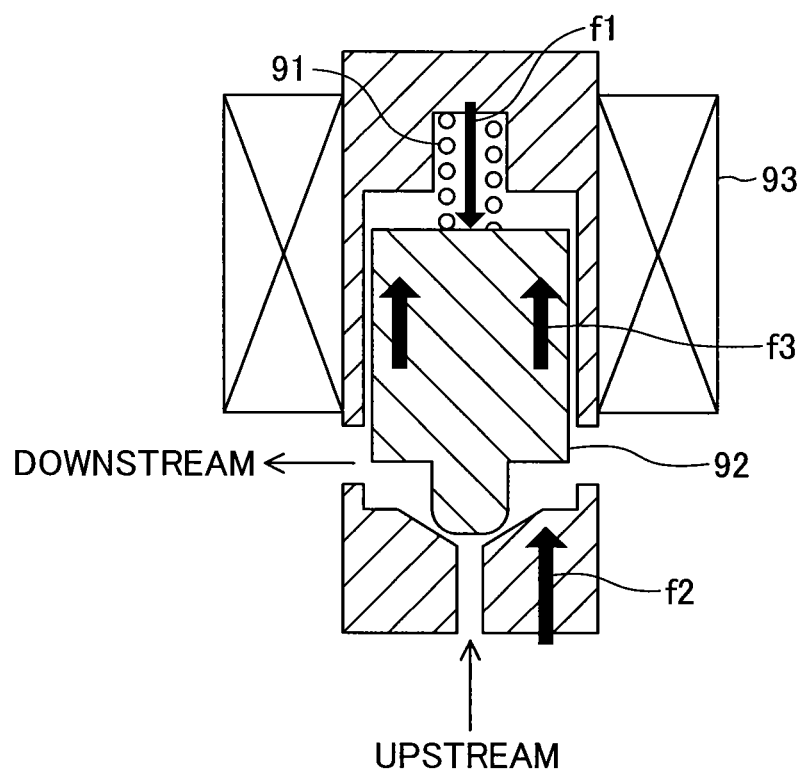
FIG. 5 is diagram illustrating an operating principle of a normally closed solenoid linear control valve.

The pressure-increasing linear control valve 44 and the pressure-decreasing linear control valve 45 are solenoid linear control valves. The operating principle of the solenoid linear control valve will be described by using a normally closed solenoid linear control valve as an example. As illustrated in FIG. 5, the normally closed solenoid linear control valve keeps closed by valve closing force (f1−f2) that is a difference between spring reaction force f1 of a spring 91 for biasing a valve element (plunger) 92 in the valve closing direction and hydraulic pressure force f2 that biases the valve element 92 in the valve opening direction due to differential pressure ΔP between a pressure at an upstream side (inlet side) and a pressure at a downstream side (outlet side). When electromagnetic force f3 generated by an application of an electric current to a solenoid 93 for opening the valve element 92 exceeds the valve closing force, the valve is opened with an opening degree according to balance of force exerted on the valve element 93. Accordingly, the opening degree of the valve element 92 is adjusted by controlling the amount of current applied to the solenoid 93 (current value), whereby the hydraulic pressure at the downstream side of the linear control valve can continuously be changed.

In the present embodiment, a normally closed solenoid linear control valve is used for the pressure-increasing linear control valves 44FL, 44FR, 44RL, and 44RR, and the pressure-decreasing linear control valves 45FL and 45FR for the front wheels, while a normally opened solenoid linear control valve is used for the pressure-decreasing linear control valves 45RL and 45RR for the rear wheels. With this, the pressure-increasing linear control valves 44FL, 44FR, 44RL, and 44RR are closed when current is not applied to their solenoids, and when current is applied to their solenoids, these valves are opened with an opening degree according to the amount of current applied to the solenoids, thereby allowing the inflow of the operating fluid into the wheel cylinders 82FL, 82FR, 82RL, and 82RR from the power hydraulic pressure generating device 30 to increase the wheel cylinder pressure. The pressure-decreasing linear control valves 45FL and 45FR for the front wheels are closed when current is not applied to their solenoids, and when current is applied to their solenoids, these valves are opened with an opening degree according to the amount of current applied to the solenoids, thereby allowing the outflow of the operating fluid to the reservoir 60 from the wheel cylinders 82FL and 82FR to decrease the wheel cylinder pressure. The pressure-decreasing linear control valves 45RL and 45RR for the rear wheels are opened when current is not applied to their solenoids, thereby allowing the outflow of the operating fluid to the reservoir 60 from the wheel cylinders 82RL and 82RR to decrease the wheel cylinder pressure. However, when current is applied to their solenoids, these valves are closed to inhibit the outflow of the operating fluid to the reservoir 60 from the wheel cylinders 82RL and 82RR. In this case, when the amount of current applied to the solenoids is small, the valve elements in the pressure-decreasing linear control valves 45RL and 45RR do not move up to the valve closing position, so that these valves are adjusted to have an opening degree according to the amount of the applied current.

Accordingly, an execution of an energization control of the pressure-increasing linear control valve 44 and the pressure-decreasing linear control valve 45 can switch among a state in which the inflow of the operating fluid to the wheel cylinder 82 from the power hydraulic pressure generating device 30 is allowed, a state in which the outflow of the operating fluid from the wheel cylinder 82 to the reservoir 60 is allowed, and a state in which neither the inflow of the operating fluid to the wheel cylinder 82 from the power hydraulic pressure generating device 30 nor the outflow of the operating fluid from the wheel cylinder 82 to the reservoir 60 is allowed. With this, the wheel cylinder pressure of each wheel can independently be controlled to a target hydraulic pressure.

An individual linear control valve device 50FL that controls the hydraulic pressure of the wheel cylinder 82FL is composed of the pressure-increasing linear control valve 44FL and the pressure-decreasing linear control valve 45FL, an individual linear control valve device 50FR that controls the hydraulic pressure of the wheel cylinder 82FR is composed of the pressure-increasing linear control valve 44FR and the pressure-decreasing linear control valve 45FR, an individual linear control valve device 50RL that controls the hydraulic pressure of the wheel cylinder 82RL is composed of the pressure-increasing linear control valve 44RL and the pressure-decreasing linear control valve 45RL, and an individual linear control valve device 50RR that controls the hydraulic pressure of the wheel cylinder 82RR is composed of the pressure-increasing linear control valve 44RR and the pressure-decreasing linear control valve 45RR. In the case where the individual linear control valve devices 50FR, 50FL, 50RR, and 50RL are not distinguished, they are merely referred to as an individual linear control valve device 50.

The brake actuator 40 includes master cut valves 46 and 47. The brake actuator 40 connects the master passage 23 and the individual passage 43FL via the master cut valve 46, and connects the master passage 24 and the individual passage 43FR via the other master cut valve 47. Both of two master cut valves 46 and 47 are a normally opened solenoid valve that keeps opened due to biasing force of a spring when a solenoid is not energized, and that is closed only when the solenoid is energized. When the master cut valve 46 is closed, the flow of the operating fluid between the pressure chamber 21 in the master cylinder 20 and the wheel cylinder 82FL for the front-left wheel is cut off, and when the master cut valve 46 is opened, the bidirectional flow of the operating fluid between the pressure chamber 21 in the master cylinder 20 and the wheel cylinder 82FL is allowed. Similarly, when the master cut valve 47 is closed, the flow of the operating fluid between the pressure chamber 22 in the master cylinder 20 and the wheel cylinder 82FR for the front-right wheel is cut off, and when the master cut valve 47 is opened, the bidirectional flow of the operating fluid between the pressure chamber 22 in the master cylinder 20 and the wheel cylinder 82FR is allowed.

The brake actuator 40 also includes a front-wheel left-right communication passage 61 that allows communication between the individual passage 43FL for the front-left wheel and the individual passage 43FR for the front-right wheel, a rear-wheel left-right communication passage 62 that allows communication between the individual passage 43RL for the rear-left wheel and the individual passage 43RR for the rear-right wheel, and a front-rear communication passage 63 that allows communication between the individual passage 43FR for the front-right wheel and the individual passage 43RL for the rear-left wheel. The front-wheel left-right communication passage 61 is provided with a front-wheel communication on-off valve 64, the rear-wheel left-right communication passage 62 is provided with a rear-wheel communication on-off valve 65, and the front-rear communication passage 63 is provided with a front-rear communication on-off valve 66.

The front-wheel communication on-off valve 64 is a normally closed solenoid valve that keeps closed by biasing force of a spring when its solenoid is not energized, and is opened only when its solenoid is energized. When the front-wheel communication on-off valve 64 is closed, the flow of the operating fluid between the wheel cylinder 82FL for the front-left wheel and the wheel cylinder 82FR for the front-right wheel is cut off, and when the front-wheel communication on-off valve 64 is opened, the flow of the operating fluid between the wheel cylinder 82FL for the front-left wheel and the wheel cylinder 82FR for the front-right wheel is allowed in both directions.

On the other hand, the rear-wheel communication on-off valve 65 is a normally opened solenoid valve that keeps opened by biasing force of a spring when its solenoid is not energized, and is closed only when its solenoid is energized. When the rear-wheel communication on-off valve 65 is opened, the flow of the operating fluid between the wheel cylinder 82RL for the rear-left wheel and the wheel cylinder 82RR for the rear-right wheel is allowed in both directions, and when the rear-wheel communication on-off valve 65 is closed, the flow of the operating fluid between the wheel cylinder 82RL for the rear-left wheel and the wheel cylinder 82RR for the rear-right wheel is cut off.

The front-rear communication on-off valve 66 is a normally closed solenoid valve that keeps closed by biasing force of a spring when its solenoid is not energized, and is opened only when its solenoid is energized. When the front-rear communication on-off valve 66 is closed, the flow of the operating fluid between the wheel cylinder 82FR for the front-right wheel and the wheel cylinder 82RL for the rear-left wheel is cut off, and when the front-wheel communication on-off valve 64 is opened, the flow of the operating fluid between the wheel cylinder 82FR for the front-right wheel and the wheel cylinder 82RL for the rear-left wheel is allowed in both directions.

Therefore, when all of the front-wheel communication on-off valve 64, the rear-wheel communication on-off valve 65, and the front-rear communication on-off valve 66 are opened, the wheel cylinders 82FL, 82FR, 82RL, and 82RR for the front-left wheel, front-right-wheel, rear-left wheel, and rear-right wheel can be communicated with one another.

The brake actuator 40 also includes an accumulator pressure sensor 51, master cylinder pressure sensors 52L and 52R, and wheel cylinder pressure sensors 53FL, 53FR, 53RL, and 53RR. The accumulator pressure sensor 51 is provided on the accumulator passage 41 that is a passage between the power hydraulic pressure generating device 30 and each pressure-increasing linear control valve 44 to detect an accumulator pressure Pacc that is a hydraulic pressure outputted from the power hydraulic pressure generating device 30. The master cylinder pressure sensors 52L and 52R are provided on the master passages 23 and 24 between the pressure chambers 21 and 22 in the master cylinder 20 and the master cut valves 46 and 47 to detect a hydraulic pressure of the operating fluid pressurized in the pressure chambers 21 and 22. The hydraulic pressure detected by the master cylinder pressure sensors 52L and 52R are referred to as master cylinder pressures PmL and PmR.

Each of the wheel cylinder pressure sensors 53FL, 53FR, 53RL, and 53RR are provided to each of the individual passages 43FL, 43FR, 43RL, and 43RR to detect a hydraulic pressure of each of wheel cylinders 82FL, 82FR, 82RL, and 82RR. The hydraulic pressures detected by the wheel cylinder pressure sensors 53FL, 53FR, 53RL, and 53RR are referred to as wheel cylinder pressures PwFL, PwFR, PwRL, and PwRR. The wheel cylinder pressure sensors 53FL, 53FR, 53RL, and 53RR and the wheel cylinder pressures PwFL, PwFR, PwRL, and PwRR are merely referred to as a wheel cylinder pressure sensor 53 and a wheel cylinder pressure Pw, when it is unnecessary to specify any one of them for front-left, front-right, rear-left, and rear-right wheels.

The power hydraulic pressure generating device 30, the brake actuator 40, and the stroke simulator device 70 are controlled to be driven by the brake ECU 100. The brake ECU 100 includes a microcomputer as a main component, and also includes, for example, a pump drive circuit, a solenoid valve drive circuit, an input interface receiving signals from various sensors, a communication interface, a power supply circuit, and the like. Four pressure-increasing linear control valves 44, four pressure-decreasing linear control valves 45, the front-wheel communication on-off valve 64, the rear-wheel communication on-off valve 65, the front-rear communication on-off valve 66, the master cut valves 46 and 47, and the simulator cut valve 72 are connected to the brake ECU 100. The brake ECU 100 outputs a solenoid drive signal to these valves to control to open or close each valve and to control the opening degree (in the case of the linear control valve) of each valve. The motor 32 provided to the power hydraulic pressure generating device 30 is also connected to the brake ECU 100, and the brake ECU 100 outputs a drive signal to the motor 32 to control to drive the motor 32.

The accumulator pressure sensor 51, the master cylinder pressure sensors 52R and 52L, and the wheel cylinder pressure sensors 53FR, 53FL, 53RR, and 53RL are connected to the brake ECU 100, whereby the brake ECU 100 receives signals indicating the accumulator pressure Pacc, the master cylinder pressures PmL and PmR, and the wheel cylinder pressures PwFR, PwFL, PwRR, and PwRL.

A pedal stroke sensor 110 and a pedal switch 111 are also connected to the brake ECU 100. The pedal stroke sensor 110 is a type of a pedal operation detecting device, and it detects a pedal stroke that is a depression amount of the brake pedal 10 and outputs a signal indicating the detected pedal stroke Sp to the brake ECU 100. The pedal switch 111 is turned on upon the depression of the brake pedal 10 up to a set position to turn on a stop lamp not illustrated. The pedal switch 111 outputs a signal (pedal switch signal) indicating a state of the switch to the brake ECU 100.

The brake ECU 100 is started when an ignition switch is turned on, or a courtesy switch outputting a signal according to an open/close state of a door of the vehicle is turned on (when the door is opened). Before the brake ECU 100 is started, energization of all solenoid control valves (on-off valves and linear control valves) provided to the brake actuator 40 and the stroke simulator device 75 is stopped. Therefore, the open/close state of each solenoid control valve is as illustrated in FIG. 1. Energization of the power hydraulic pressure generating device 30 is also stopped.

Next, a brake control executed by the brake ECU 100 will be described. The brake ECU 100 executes in parallel a hydraulic control for allowing the hydraulic pressure of each wheel cylinder to follow a target hydraulic pressure to generate braking force and a communication control for controlling a communication state among the respective wheel cylinders 82. The target hydraulic pressure used for the hydraulic control is different depending on a vehicle to which the brake control device is applied. An electric vehicle or a hybrid vehicle can perform a regenerative braking control in which rotating force of wheels generates electric power, and the generated electric power is collected to a battery to acquire braking force. Therefore, such vehicle can perform brake regenerative cooperation control using both regenerative braking and hydraulic braking. On the other hand, a vehicle that generates driving force only by an internal combustion engine cannot generate regenerative braking force. Therefore, such vehicle generates braking force only by the hydraulic control. The brake control device according to the present embodiment is applied to an electric vehicle or a hybrid vehicle to perform a brake regenerative cooperation control, but can be applied to a vehicle generating driving force only by an internal combustion engine.

In the hydraulic control, a pedal effort obtained by the driver's depressing operation of the brake pedal 10 is used only for detecting the brake operation amount without being transmitted to the wheel cylinder 82. Instead, the hydraulic pressure outputted from the power hydraulic pressure generating device 30 is transmitted to the wheel cylinder 82 after being individually adjusted by the pressure-increasing linear control valve 44 and the pressure-decreasing linear control valve 45 for each wheel. In the hydraulic control, the master cut valves 46 and 47 are maintained to be closed due to energization of their solenoids. The simulator cut valve 72 is kept opened due to energization of the solenoid. All of the pressure-increasing linear control valves 44 and the pressure-decreasing linear control valves 45 are controlled to have an opening degree according to an energization amount under an energization control state. Therefore, the hydraulic pressure outputted from the master cylinder 20 is not supplied to the wheel cylinder 82 for each wheel, but the hydraulic pressure outputted from the power hydraulic pressure generating device 30 is supplied thereto after being individually adjusted.

As described later, when the communication control is executed, some pressure-increasing linear control valves 44 and some pressure-decreasing linear control valves 45 are deactivated, and the remaining pressure-increasing linear control valves 44 and the pressure-decreasing linear control valves 45 are under the energization control state. This hydraulic control will be described in the case where the hydraulic control is independently executed for each of four wheels. A process of selecting the pressure-increasing linear control valve 44 and the pressure-decreasing linear control valve 45 used for the hydraulic control will also be described later.

The brake ECU 100 starts the brake regenerative cooperation control in response to a brake request. The brake request is generated when braking force has to be applied to the vehicle, e.g., when a driver depresses the brake pedal 10. When receiving the brake request, the brake ECU 100 calculates requested braking force based on the pedal stroke Sp detected by the pedal stroke sensor 110 and the master cylinder pressures PmL and PmR detected by the master cylinder pressure sensors 52L and 52R. In this case, the brake ECU 100 sets either one of the master cylinder pressures PmL and PmR or a value (e.g., an average) formed by combining both pressures as a master cylinder pressure Pm.

The requested braking force is set larger, as the pedal stroke Sp is larger, or as the master cylinder pressure Pm is larger. In this case, weighting coefficients Ks and Kr are multiplied respectively to the pedal stroke Sp and the master cylinder pressure Pm. The requested braking force may be calculated by setting the weighting coefficient Ks for the pedal stroke Sp to be larger within the range where the pedal stroke Sp is small, or by setting the weighting coefficient Kr for the master cylinder pressure Pm to be larger within the range where the pedal stroke Sp is large.

The brake ECU 100 transmits information indicating the calculated requested braking force to a regenerative ECU. The regenerative ECU calculates braking force generated due to power regeneration in the requested braking force, and transmits information indicating the regenerative braking force, which is the result of the calculation, to the brake ECU 100. With this process, the brake ECU 100 calculates requested hydraulic braking force, which is braking force that should be generated by the brake control device, by subtracting the regenerative braking force from the requested braking force. The regenerative braking force generated due to the power regeneration by the regenerative ECU is changed not only by the rotating speed of the motor, but also by a regenerative current control due to a state of charge (SOC) of a battery, for example. Accordingly, the brake ECU 100 can calculate appropriate requested hydraulic braking force by subtracting the regenerative braking force from the requested braking force.

The brake ECU 100 calculates a target hydraulic pressure of each wheel cylinder 82 based on the calculated requested hydraulic braking force, and controls a drive current of the pressure-increasing linear control valve 44 and the pressure-decreasing linear control valve 45 by a feedback control so as to cause the wheel cylinder pressure to be equal to the target hydraulic pressure. Specifically, the brake ECU 100 controls a current flowing through the pressure-increasing linear control valve 44 and the pressure-decreasing linear control valve 45 in order that the wheel cylinder pressure Pw detected by the wheel cylinder pressure sensor 53 for each wheel follows the target hydraulic pressure.

With this process, the operating fluid is supplied to the wheel cylinder 82 from the power hydraulic pressure generating device 30 via the pressure-increasing linear control valve 44, whereby braking force is applied to the wheels. In addition, the operating fluid is discharged from the wheel cylinder 82 via the pressure-decreasing linear control valve 45 as necessary, whereby the braking force applied to the wheels is adjusted.

During the normal brake control, the same target hydraulic pressure is set for four wheels. However, when a vehicle behavior control such as a turning control or a special brake control such as an ABS control is performed, a different target hydraulic pressure is set for each wheel, and the pressure-increasing linear control valve 44 and the pressure-decreasing linear control valve 45 are controlled in order that the wheel cylinder pressure Pw detected by the wheel cylinder pressure sensor 53 for each wheel follows the corresponding target hydraulic pressure.

The brake ECU 100 stores valve-opening current characteristics of each of the pressure-increasing linear control valves 44 and each of the pressure-decreasing linear control valves 45 for controlling the energization of the pressure-increasing linear control valves 44 and the pressure-decreasing linear control valves 45. A solenoid linear control valve has a certain relationship between a differential pressure $\Delta P$, which is a difference between an upstream-side hydraulic pressure (inlet-side hydraulic pressure) and a downstream-side hydraulic pressure (outlet-side hydraulic pressure), and a valve-opening current. In a normally closed solenoid linear control valve, the valve-opening current means a current value at the time when a valve element that is closed starts to be opened due to an increase in a current flowing through a solenoid. In a normally opened solenoid linear control valve, the valve-opening current means a current value at the time when a valve element that is closed starts to be opened due to a decrease in a current flowing through a solenoid. The valve-opening current characteristic represents a correlation between the valve-opening current and the differential pressure $\Delta P$. The normally closed solenoid linear control valve has the valve-opening current characteristic in which, the larger the differential pressure $\Delta P$ becomes, the smaller the valve-opening current becomes according to a linear function. The normally opened solenoid linear control valve has the valve-opening current characteristic in which, the larger the differential pressure $\Delta P$ becomes, the larger the valve-opening current becomes according to a linear function.

When controlling the energization of the pressure-increasing linear control valve 44 and the pressure-decreasing linear control valve 45, the brake ECU 100 obtains a valve-opening current i open corresponding to the differential pressure $\Delta P$ between the upstream-side hydraulic pressure and the downstream-side hydraulic pressure of the linear control valve by referring to the valve-opening current characteristic, and sets a target current i* applied to the linear control valve by using the valve-opening current i open as a reference. For example, the target current i* is calculated by adding a value, which is obtained by multiplying a deviation between the target hydraulic pressure P* and the wheel cylinder pressure Pw by a feedback gain Gfb, to the valve-opening current i open (i*=i open+Gfb·(P*−Pw)). When the deviation (P*−Pw) is positive, the pressure-increasing linear control valve 44 is opened with an opening degree according to the deviation to increase the wheel cylinder pressure. When the deviation (P*−Pw) is negative, a feedback control term is calculated by using the absolute value of the deviation, and the pressure-decreasing linear control valve 45 is opened with an opening degree according to the absolute value of the deviation to decrease the wheel cylinder pressure. The feedback gain Gfb is separately set upon increasing pressure and upon decreasing pressure.

When the accumulator pressure Pacc detected by the accumulator pressure sensor 51 is less than a minimum set pressure set beforehand, the brake ECU 100 drives the motor 32 to increase the pressure of the operating fluid by the pump 31 so as to control the accumulator pressure Pacc to always fall within the set pressure range.

The brake ECU 100 also keeps the simulator cut valve 72 opened. With this, the operating fluid sent from the pressure chamber 21 in the master cylinder 20 is supplied to the stroke simulator 71 with the driver's pedal operation for the brake pedal 10. Thus, the brake ECU 100 can exert reaction force according to the driver's pedal effort to the brake pedal 10, thereby being capable of providing satisfactory pedal operation feeling to the driver.

In the brake ECU 100, the system configuration executing the hydraulic control is divided into two control block systems, and each block system independently includes a microcomputer, a solenoid valve drive circuit, an input/output interface, a power supply circuit, and the like. In the present embodiment, the configuration controlling the hydraulic pressures of the wheel cylinders 82 for the diagonal wheels is specified as one control block system. Specifically, the system is divided into a first control block 101 that controls the hydraulic pressure of the wheel cylinder 82FL for the front-left wheel and the hydraulic pressure of the wheel cylinder 82RR for the rear-right wheel, and a second control block 102 that controls the hydraulic pressure of the wheel cylinder 82FR for the front-right wheel and the hydraulic pressure of the wheel cylinder 82RL for the rear-left wheel. Therefore, in the first control block 101, the energization of the individual linear control valve devices 50FL and 50RR is controlled based on the hydraulic pressure sensors 53FL and 53RR, and in the second control block 102, the energization of the individual linear control valve devices 50FR and 50RL is controlled based on the hydraulic pressure sensors 53FR and 53RL. The front-wheel communication on-off valve 64, the rear-wheel communication on-off valve 65, the front-rear communication on-off valve 66, the master cut valves 46 and 47, the simulator cut valve 72, and the power hydraulic pressure generating device 30 are configured to be capable of being controlled by any of two control block systems 101 and 102. The microcomputer in the first control block 101 and the microcomputer in the second control block 102 are connected to each other so as to make communication, whereby they can receive and transmit their control information with each other.

In the brake ECU 100 thus configured, even when either one of the control blocks becomes abnormal, the other control block can continue the hydraulic control. In this case, the hydraulic pressure of some wheel cylinders 82, which hydraulic pressure is a subject to be controlled by the abnormal control block, can be controlled by using the normal control block due to the later-described communication control.

<Communication Control>

When the pressure-increasing linear control valve 44 or the pressure-decreasing linear control valve 45 is opened, an operating noise sometimes occurs. This operating noise is generated by the transmission of pulsation of the hydraulic pressure to pipes or a vehicle body, the pulsation being generated at the moment the pressure-increasing linear control valve 44 or the pressure-decreasing linear control valve 45 is opened. This operating noise might provide uncomfortable feeling to a driver. In the system according to the present embodiment in which the pressure-increasing linear control valve 44 and the pressure-decreasing linear control valve 45 are provided to the wheel cylinder 82 for each of the front-left, front-right, rear-left, and rear-right wheels, these linear control valves 44 and 45 being independently controlled, much operating noise occurs. During the normal brake control in which a vehicle behavior control such as a turning control or a special brake control such as an ABS control is not performed, a target hydraulic pressure P* for four wheel cylinders 82 is set to be the same (same value), so that the hydraulic pressure of each of the wheel cylinders 82 is not necessarily controlled independently by the individual linear control valve device. In view of this, in the present embodiment, the hydraulic control is executed under the condition in which the four wheel cylinders 82 are communicated with one another, and some of the pressure-increasing linear control valves 44 and some of the pressure-decreasing linear control valve 45 are deactivated, depending on a case, in order to suppress the occurrence (number of occurrences) of an operating noise.

Figure 2:
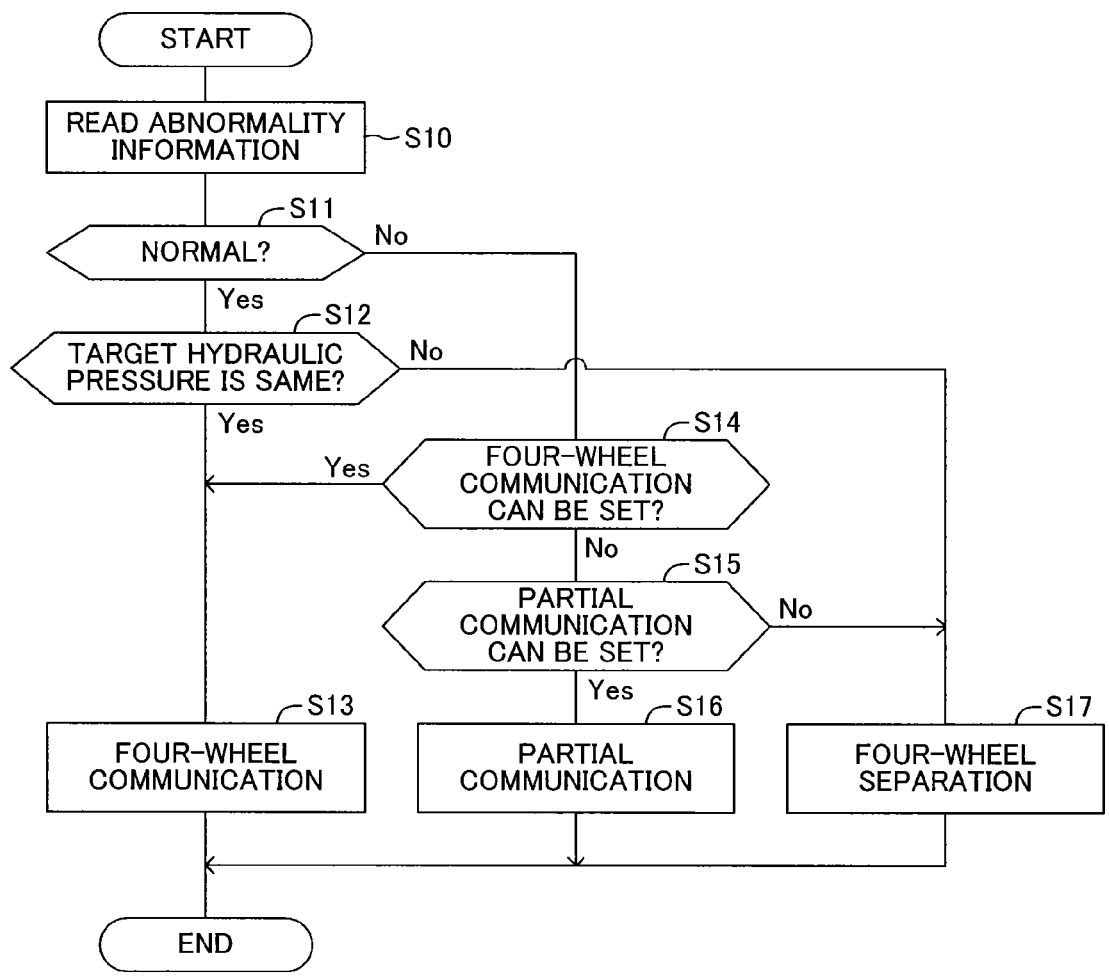
FIG. 2 is a flowchart illustrating a communication control routine.

FIG. 2 illustrates a communication control routine executed by the microcomputer in the brake ECU 100. The microcomputer in the first control block 101 and the microcomputer in the second control block 102, which share information with each other, execute the communication control routine in cooperation with each other. However, it may be configured such that the microcomputer in either one of the control blocks preferentially executes this routine, and when something abnormal occurs in this control block, the microcomputer in the other control block executes this routine. Alternatively, a microcomputer exclusively used for the communication control may be provided, and this microcomputer exclusively used for the communication control may acquire information from the microcomputer in the first control block and the microcomputer in the second control block to execute the communication control routine.

The communication control routine is repeatedly executed in a predetermined short cycle after the brake ECU 100 is started, and an initial diagnosis process in the brake control device is finished. After the communication control routine is started, the brake ECU 100 reads abnormality information in step S10. In step S11, the brake ECU 100 determines whether the brake control device is normal or not, i.e., whether abnormality is detected in the brake control device or not, based on the abnormality information. The brake ECU 100 includes an abnormality detection unit that detects abnormality in the brake control device, such as abnormality in a control system or an abnormal leakage of operating fluid. This abnormality detection unit repeatedly executes an abnormality detection routine (not illustrated) in a predetermined cycle. Therefore, in step S10, the detection result of the abnormality detection routine is read. This detection result includes not only the result as to whether abnormality occurs or not but also information indicating the detail of the abnormality.

The abnormality detection will be described here. The brake ECU 100 checks all abnormalities in the brake control device, such as abnormality in the control system or an abnormal leakage of operating fluid. The abnormality of the control system means a state in which a hydraulic pressure of at least one of the wheel cylinders 82 cannot be controlled. For example, the abnormality of the control system corresponds to the case where at least one of the solenoid control valves including the pressure-increasing linear control valve 44, the pressure-decreasing linear control valve 45, the communication on-off valves 64, 65, and 66, the master cut valves 46 and 47, and the simulator cut valve 72 are disconnected or short-circuited. The abnormality of the control system also corresponds to the case where at least one of the sensors including the hydraulic pressure sensors 51, 52L, 52R, 53FL, 53FR, 53RL, and 53RR, the pedal stroke sensor 110, and the pedal switch 111 does not output appropriate detection values. The abnormality of the control system also corresponds to the case where operating fluid with an appropriate pressure cannot be supplied from the power hydraulic pressure generating device 30 (e.g., the motor 32 is in failure). The abnormality of the control system also corresponds to an abnormal power supply state where appropriate electric power cannot be supplied to the solenoid valves, sensors, and motors.

On the other hand, as for the abnormal leakage of the operating fluid, it does not matter whether the possibility of the leakage of the operating fluid is high or low, or whether the leaked amount is large or small. Therefore, the state where it cannot be determined that the leakage does not occur is determined as an abnormal leakage of the operating fluid, even when the possibility of the leakage of the operating fluid is extremely low, or even when the leaked amount is extremely small. The leakage of the operating fluid corresponds to the case where a level switch (not illustrated) provided to the reservoir 60 detects the reduction in a level of the operating fluid. The leakage of the operating fluid also corresponds to the case where the relationship between the stroke of the brake pedal 10 and the hydraulic pressure of the master cylinder 20 is outside an appropriate range. The leakage of the operating fluid corresponds to the case where the accumulator pressure Pacc detected by the accumulator pressure sensor 51 does not exceed a fluid leakage determination value, even if the pump 31 continues to operate for a set time or longer.

In some cases, the abnormality cannot be determined as the abnormality in the control system or an abnormal leakage of operating fluid, in the case where the hydraulic pressure Pw of each wheel cylinder does not become the same during the execution of the later-described four-wheel communication mode, or where the wheel cylinder pressure Pw does not follow the target hydraulic pressure even if the hydraulic control is performed. Such case is determined as the case where something abnormal occurs in the brake control device.

When abnormality is not detected in the brake control device (S11: Yes), the brake ECU 100 proceeds to step S12 to determine whether the target hydraulic pressures P* for the four wheel cylinders 82 are substantially the same value or not. For example, the brake ECU 100 reads the target hydraulic pressures P* for the four wheel cylinders 82, extracts a maximum value P*max and a minimum value P*min from the read target hydraulic pressures, and determines whether the difference between them (P*max−P*min) is smaller than a threshold value A or not. When the difference between the target hydraulic pressures (P*max−P*min) is smaller than the threshold value A, the brake ECU 100 determines that the target hydraulic pressures P* for the four wheel cylinders 82 are substantially the same value. The threshold value A is a set value within a range by which the brake ECU 100 can determine that it is no problem in executing the hydraulic control with the target hydraulic pressures P* for the four wheel cylinders 82 being set to be the same value. A brake mode satisfying the conditions in steps S11 and S12 corresponds to a normal brake control. When the brake pedal operation is not performed, the target hydraulic pressures P* for the four wheel cylinders 82 are all set to zero (atmospheric pressure), so that the determination in step S12 becomes "Yes".

Figure 6:
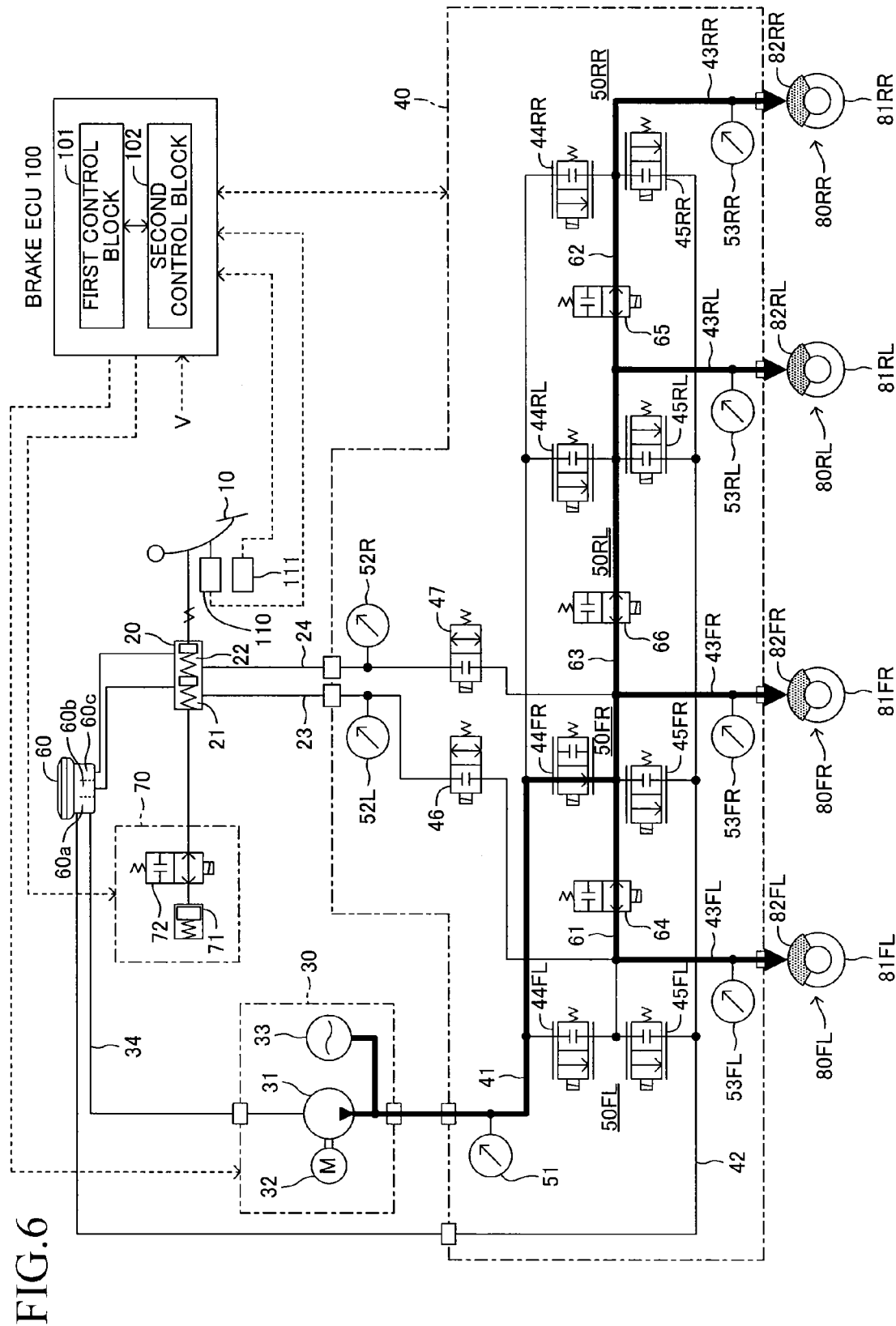
FIG. 6 is an explanatory view illustrating an example of a flow path of operating fluid upon a pressure increase in a four-wheel communication mode.
Figure 7:
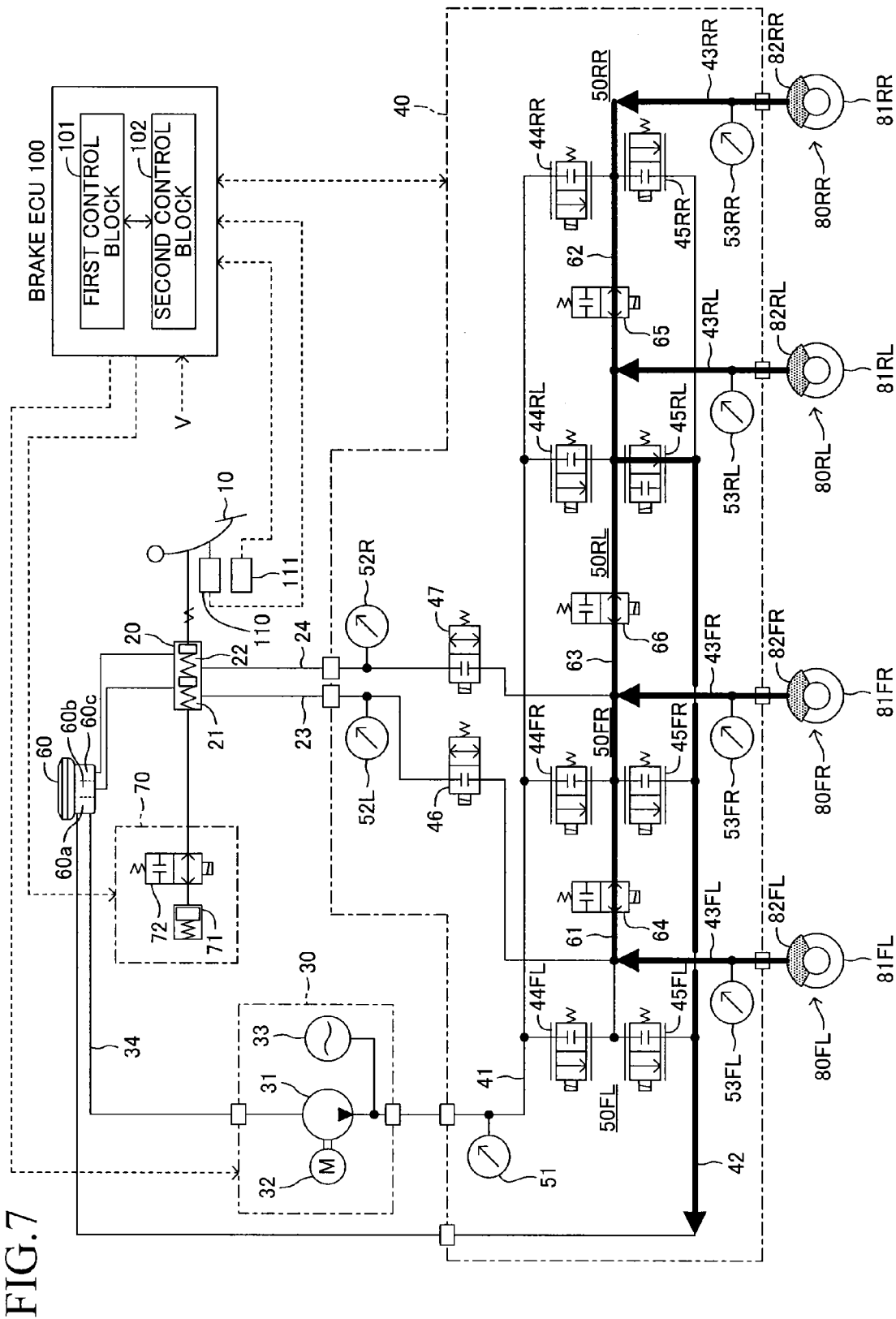
FIG. 7 is an explanatory view illustrating an example of a flow path of operating fluid upon a pressure decrease in a four-wheel communication mode.

When determining that the target hydraulic pressures P* of the four wheel cylinders 82 are the same value (S12: Yes), the brake ECU 100 proceeds to step S13 to set the communication mode to the four-wheel communication mode. In the four-wheel communication mode, the front-wheel communication on-off valve 64, the rear-wheel communication on-off valve 65, and the front-rear communication on-off valve 66 are all kept opened as illustrated in FIGS. 6 and 7. In this case, the front-wheel communication on-off valve 64 and the front-rear communication on-off valve 66, which are a normally closed solenoid valve, are energized, while the rear-wheel communication on-off valve 65 that is a normally opened type is not energized. With this, the four wheel cylinders 82 are communicated with one another. In the four-wheel communication mode, the hydraulic pressure of each wheel cylinder 82 can be increased by using any of the pressure-increasing linear control valves 44, and the hydraulic pressure of each wheel cylinder 82 can be decreased by using any of the pressure-decreasing linear control valves 45. Since the hydraulic pressures of all wheel cylinders 82 become the same, a common hydraulic pressure that is the hydraulic pressure of each wheel cylinder can be detected by using the detection value of any of the hydraulic pressure sensors 53. The brake ECU 100 ends the communication control routine after setting the communication mode. Then, the brake ECU 100 repeatedly executes the communication control routine at a predetermined cycle. Therefore, when abnormality is not detected in the brake control device, the communication mode is set to the four-wheel communication mode, even if the brake request is not issued, so long as the target hydraulic pressures P* are the same. In other words, the four wheel cylinders 82 are always kept communicated with one another after the start of the brake ECU 100.

When abnormality is not detected in the brake control device, the brake ECU 100 keeps the communication mode in the four-wheel communication mode, even if the brake request is not issued. In addition to this process, the brake ECU 100 also keeps the master cut valves 46 and 47 closed.

Figure 12:
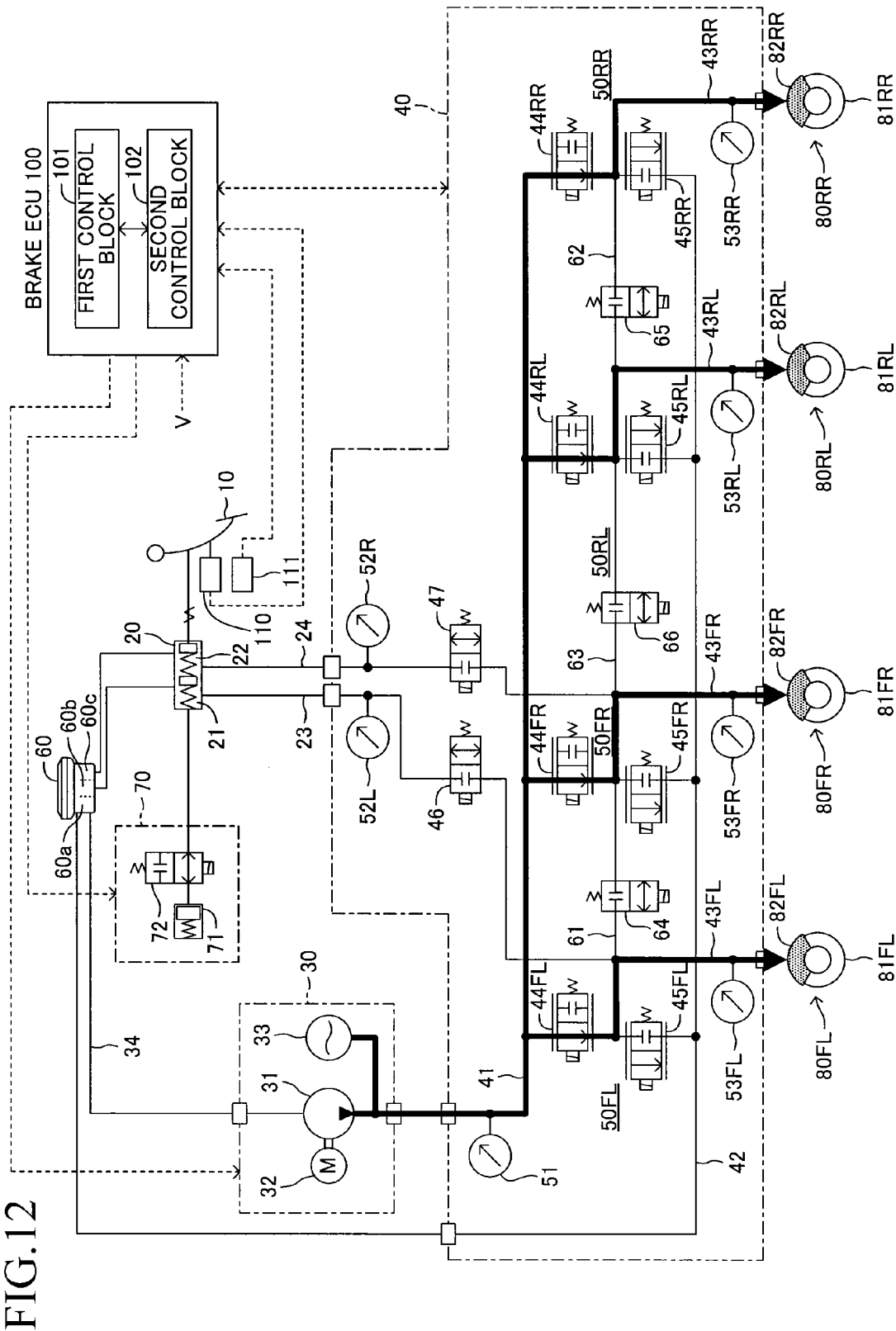
FIG. 12 is an explanatory view illustrating an example of a flow path of operating fluid upon a pressure increase in a four-wheel separation communication mode.
Figure 13:
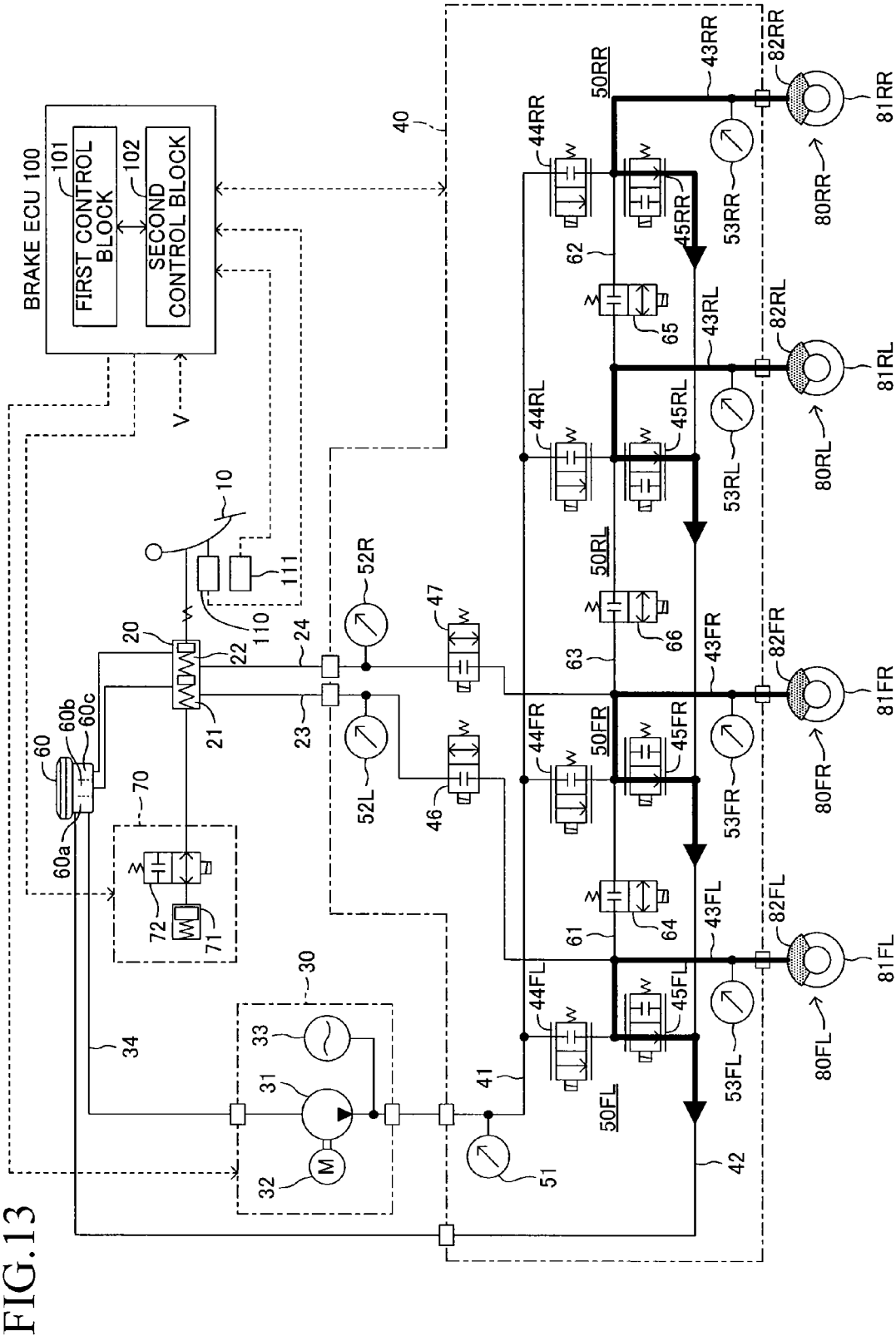
FIG. 13 is an explanatory view illustrating an example of a flow path of operating fluid upon a pressure decrease in a four-wheel separation communication mode.

On the other hand, when determining that the target hydraulic pressures P* of the four wheel cylinders 82 are not the same value (S12: No), the brake ECU 100 proceeds to step S17 to set the communication mode to a four-wheel separation mode. In the four-wheel separation mode, the front-wheel communication on-off valve 64, the rear-wheel communication on-off valve 65, and the front-rear communication on-off valve 66 are all kept closed as illustrated in FIGS. 12 and 13. In this case, the front-wheel communication on-off valve 64 and the front-rear communication on-off valve 66, which are a normally closed solenoid valve, are not energized, while the rear-wheel communication on-off valve 65 that is a normally opened type is energized. With this, the communication among the four wheel cylinders 82 is shut off. In the four-wheel separation mode, the hydraulic pressure of each wheel cylinder 82 is independently adjusted by each pressure-increasing linear control valve 44 and each pressure-decreasing linear control valve 45. In addition, even if a control component for a specific wheel is in failure, the hydraulic control for the other wheels can be prevented from being affected by this failure as much as possible.

When determining that abnormality is detected in the brake control device in step S11, the brake ECU 100 determines in step S14 whether the four-wheel communication mode can be executed or not based on the detail of the abnormality.

The brake ECU 100 stores beforehand a four-wheel communication allowable condition. Only when the detail of the abnormality satisfies this four-wheel communication allowable condition, the brake ECU 100 determines that the four-wheel communication mode can be executed. When determining that the four-wheel communication mode can be executed (S14: Yes), the brake ECU 100 proceeds to step S13 to set the communication mode to the four-wheel communication mode.

The four-wheel communication allowable condition is composed of a first condition in which, even if abnormality is detected in some of the pressure-increasing linear control valves 44 or in some of the pressure-decreasing linear control valves 45, the hydraulic pressures of all wheel cylinders 82 can be controlled by the activation of the remaining pressure-increasing linear control valves 44 or the remaining pressure-decreasing linear control valves 45, and a second condition in which, even if abnormality is detected in some of the hydraulic pressure sensors 53, the common hydraulic pressure of each wheel cylinder can be detected by the remaining hydraulic pressure sensors 53. Therefore, when abnormality is detected in none of the pressure-increasing linear control valves 44 or none of the pressure-decreasing linear control valves 45, the second condition becomes the four-wheel communication allowable condition, and when abnormality is detected in none of the hydraulic pressure sensors 53, the first condition becomes the four-wheel communication allowable condition. When abnormality is detected in some of the pressure-increasing linear control valves 44 or in some of the pressure-decreasing linear control valves 45, as well as when abnormality is detected in some of the hydraulic pressure sensors 53, an AND condition of the first condition and the second condition becomes the four-wheel communication allowable condition.

For example, when abnormality is detected only in the pressure-increasing linear control valves 44, and at least one normal pressure-increasing linear control valve 44 is present (at least one pressure-increasing linear control valve 44 has no abnormality), the brake ECU 100 determines that the four-wheel communication mode can be executed, and sets the communication mode to the four-wheel communication mode. Since the pressure-increasing linear control valve 44 is a normally closed type, it can keep closed in an abnormal status such as disconnection. Therefore, this configuration can prevent the operating fluid supplied from the power hydraulic pressure generating device 30 from flowing through the wheel cylinder 82 from the pressure-increasing linear control valve 44 having abnormality. Accordingly, the brake ECU 100 can appropriately increase the hydraulic pressures of all wheel cylinders 82 with the normal pressure-increasing linear control valve 44 by setting the communication mode to the four-wheel communication mode.

When abnormality is detected in either one or both of the pressure-decreasing linear control valves 45FL and 45FR for the front wheels, but abnormality is not detected in either one or both of the pressure-decreasing linear control valves 45RL and 45RR for the rear wheels, the brake ECU 100 determines in step S14 that the four-wheel communication mode can be executed, and sets the communication mode to the four-wheel communication mode. Since the pressure-decreasing linear control valves 44FL and 45FR for the front wheels are a normally closed type, they can keep closed in an abnormal status such as disconnection. Therefore, this configuration can prevent the operating fluid from flowing through the return passage 42 from the pressure-decreasing linear control valve 45 having abnormality. Accordingly, the brake ECU 100 can appropriately decrease the hydraulic pressures of all wheel cylinders 82 with the normal pressure-decreasing linear control valves 45RL and 45RR by setting the communication mode to the four-wheel communication mode. On the other hand, the pressure-decreasing linear control valves 45RL and 45RR for the rear wheels are a normally opened type. Therefore, they can keep opened in an abnormal status such as disconnection. When the communication mode is set to the four-wheel communication mode, the appropriate hydraulic control cannot be executed. Therefore, the four-wheel communication allowable condition is not satisfied, so that the brake ECU 100 determines "No" in step S14.

When abnormality is not detected in the pressure-decreasing linear control valves 45RL and 45RR for the rear wheels even if abnormality is detected in both the pressure-increasing linear control valve 44 and the pressure-decreasing linear control valve 45, the brake ECU 100 proceeds to step S13 to set the communication mode to the four-wheel communication mode, since this situation satisfies the four-wheel communication allowable condition.

When abnormality is detected in only the hydraulic pressure sensors 53, but at least one normal hydraulic pressure sensor 53 is present (at least one hydraulic pressure sensor 53 has no abnormality), the brake ECU 100 determines in step S14 that the four-wheel communication mode can be executed. Then, the brake ECU 100 proceeds to step S13 to set the communication mode to the four-wheel communication mode. In the four-wheel communication mode, the respective wheel cylinders 82 have the same pressure. Therefore, the brake ECU 100 can detect the hydraulic pressures of all wheel cylinders 82 with the normal hydraulic pressure sensor 53 by setting the communication mode to the four-wheel communication mode.

When the four-wheel communication allowable condition is not established (S14: No), the brake ECU 100 proceeds to step S15. The brake ECU 100 determines in step S15 whether a partial communication mode can be executed or not based on the detail of the abnormality detected by the abnormality detection routine. The partial communication mode is a mode in which only some of the wheel cylinders 82 out of the four wheel cylinders 82 are communicated with one another. The brake ECU 100 determines in step S15 that the partial communication mode is possible, in the case where at least the abnormal portion can be specified, and it is all right to allow some wheel cylinders 82 to be communicated with one another. The brake ECU 100 then proceeds to step S16 to set the communication mode to the partial communication mode. In the partial communication mode, the communication system of the wheel cylinders 82 is set according to the detail of the detected abnormality.

The brake ECU 100 stores beforehand an abnormality pattern by which the partial communication mode is possible, and a communication system corresponding to this abnormality pattern as a partial communication allowable condition. The brake ECU 100 determines whether the partial communication mode can be executed or not based on whether the detail of the detected abnormality is included in the abnormality pattern specified by the partial communication allowable condition. When determining that the partial communication mode can be executed (S15: Yes), the brake ECU 100 controls the open/close state of the front-wheel communication on-off valve 64, the rear-wheel communication on-off valve 65, and the front-rear communication on-off valve 66 according to the communication system specified by the partial communication allowable condition (S16).

Figure 8:
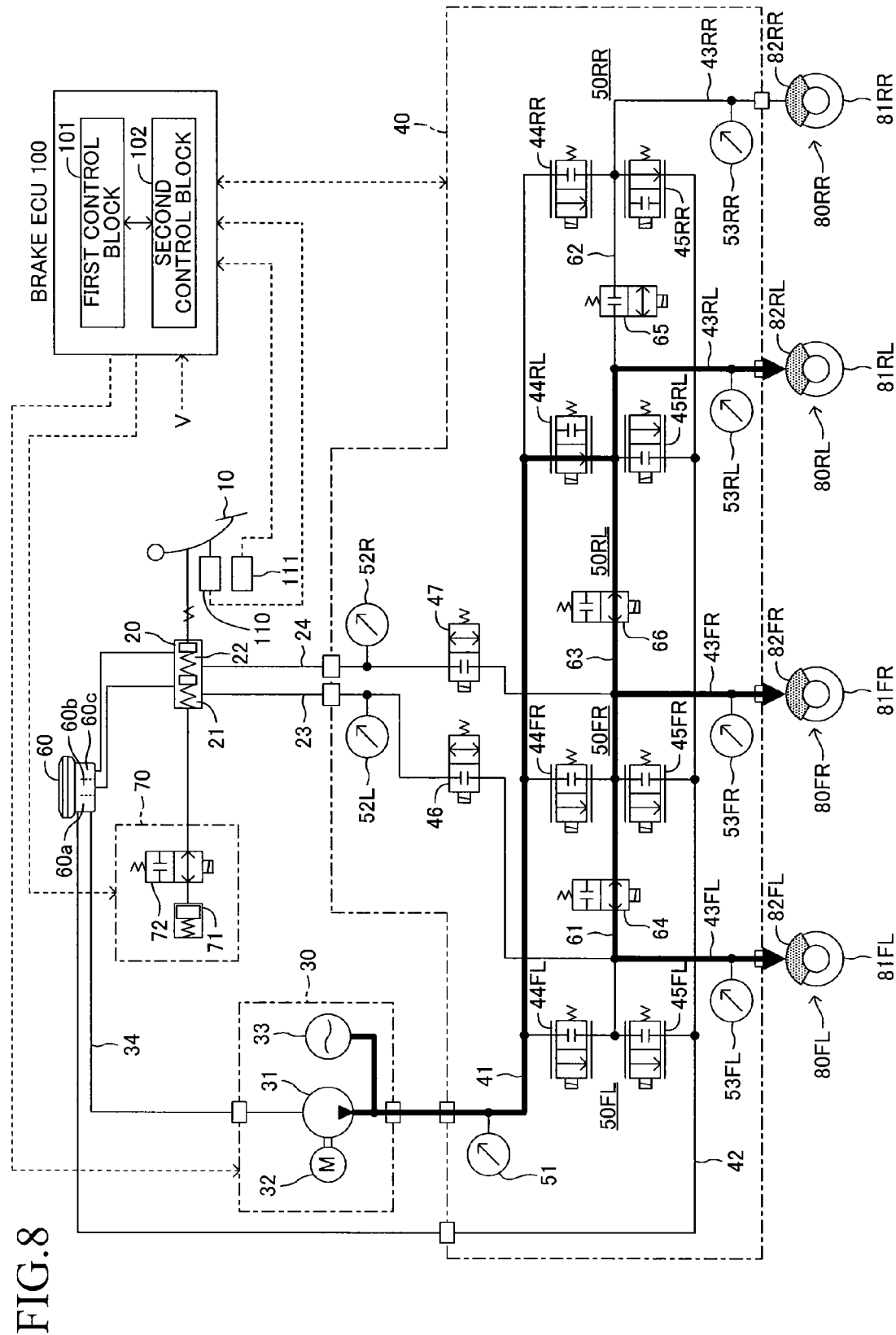
FIG. 8 is an explanatory view illustrating an example of a flow path of operating fluid upon a pressure increase in a partial communication mode.
Figure 9:
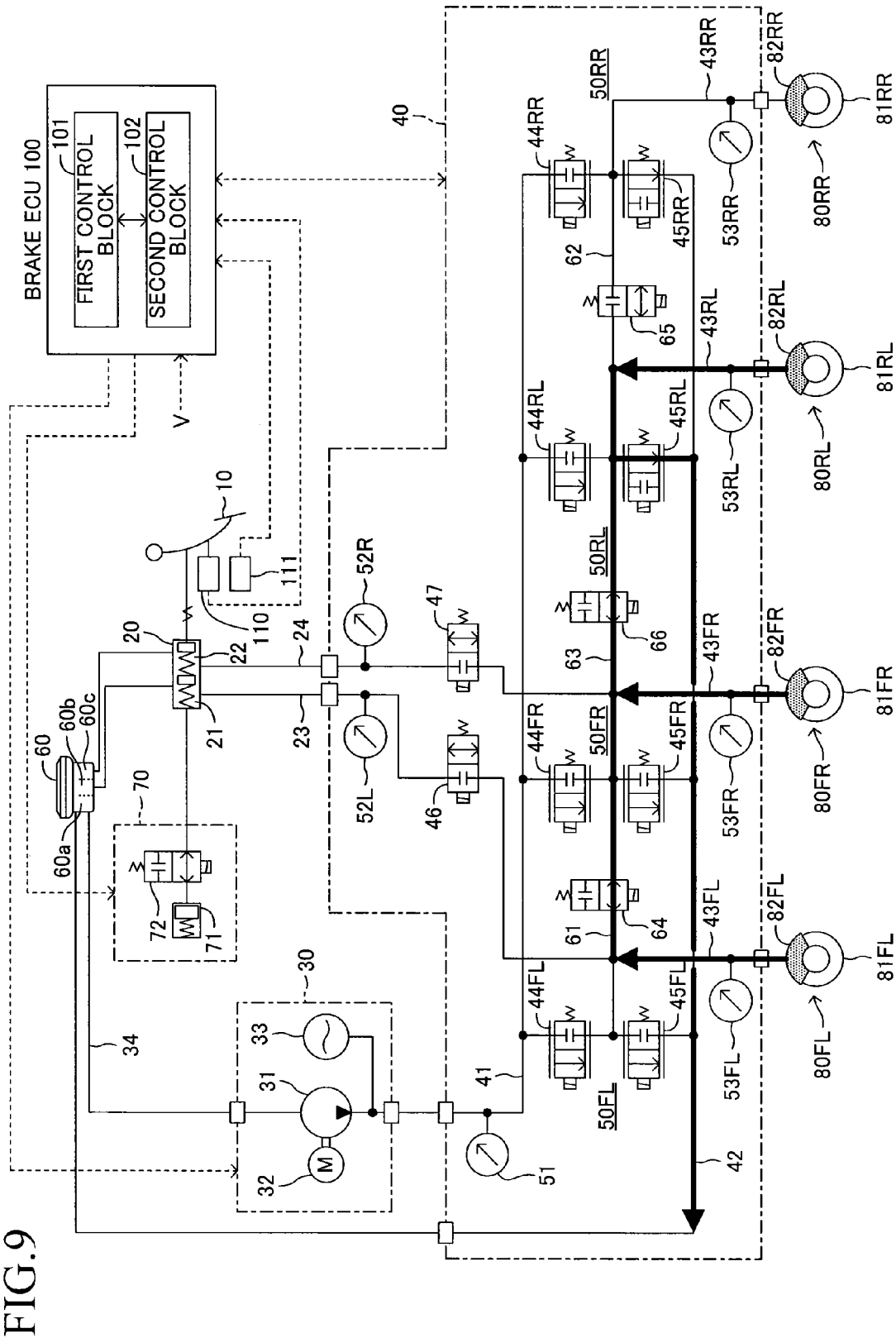
FIG. 9 is an explanatory view illustrating an example of a flow path of operating fluid upon a pressure decrease in a partial communication mode.

For example, when abnormality is detected in only the pressure-decreasing linear control valve 45RR controlling the hydraulic pressure of the wheel cylinder 82RR for the rear-right wheel, the brake ECU 100 determines in step S15 that the partial communication mode can be executed, and sets the communication mode to the partial communication mode. In this case, the brake ECU 100 keeps the rear-wheel communication on-off valve 65 closed, and keeps the front-wheel communication on-off valve 64 and the front-rear communication on-off valve 66 opened as illustrated in FIGS. 8 and 9. With this operation, the wheel cylinders 82FL and 82FR for the front wheels and the wheel cylinder 82RL for the rear-left wheel are kept communicated with one another. Accordingly, the brake ECU 100 can inhibit the wheel cylinder 82RR for the rear-right wheel from communicating with the other wheel cylinders 82. In this case, the brake ECU 100 stops energization of the pressure-increasing linear control valve 44RR to open the pressure-increasing linear control valve 44RR, whether the hydraulic control is now executed or not.

When abnormality is detected only in the pressure-decreasing linear control valve 45RL controlling the hydraulic pressure of the wheel cylinder 82RL for the rear-left wheel, the brake ECU 100 keeps the front-rear communication on-off valve 66 and the rear-wheel communication on-off valve 65 closed, and keeps the front-wheel communication on-off valve 64 opened. With this operation, the brake ECU 100 can inhibit the wheel cylinder 82RL for the rear-left wheel from communicating with the other wheel cylinders 82. In this case, the brake ECU 100 stops energization of the pressure-increasing linear control valve 44RL to open the pressure-increasing linear control valve 44RL, whether the hydraulic control is now executed or not. Under this situation, the hydraulic pressure of the wheel cylinder 82RR for the rear-right wheel cannot be controlled by using the pressure-increasing linear control valves 44FL and 44FR and the pressure-decreasing linear control valves 45FL and 45FR for the front wheels, and can be controlled only by using the pressure-increasing linear control valve 44RR and the pressure-decreasing linear control valve 45RR.

In the case where there is a possibility of a leakage of operating fluid, and the portion from which the leakage occurs can be determined to be the wheel cylinder 82 for a specific wheel, the brake ECU 100 may release the specified wheel cylinder 82 from the communication state. For example, when it can be determined that a leakage of operating fluid occurs only on the wheel cylinder 82RR for the rear-right wheel, the brake ECU 100 keeps the rear-wheel communication on-off valve 65 closed, and keeps the front-wheel communication on-off valve 64 and the front-rear communication on-off valve 66 closed. With this operation, the wheel cylinders 82FL and 82FR for the front-left and front-right wheels and the wheel cylinder 82RL for the rear-left wheel can be kept communicated with one another. Therefore, the brake ECU 100 can inhibit the wheel cylinder 82RR for the rear-right wheel from communicating with the other wheel cylinders 82. In this case, the brake ECU 100 stops energization of the pressure-increasing linear control valve 44RR to close the pressure-increasing linear control valve 44RR, whether the hydraulic control is now executed or not.

When abnormality occurs on one of the divided control block systems, the brake ECU 100 sets the communication mode to the partial communication mode. With this, the brake ECU 100 can control the hydraulic pressure of the wheel cylinder 82 for at least the front wheels in the control block having abnormality by using the other control block. In this case, the communication between the wheel cylinder 82RL (or 82RR) for the rear wheels that is the subject to be controlled by the control block having abnormality and the other wheel cylinders 82 has to be shut off. For example, when abnormality occurs in the first control block 101 controlling the hydraulic pressures of the wheel cylinder 82FL for the front-left wheel and the wheel cylinder 82RR for the rear-right wheel, the brake ECU 100 keeps the rear-wheel communication on-off valve 65 closed, and keeps the front-wheel communication on-off valve 64 and the front-rear communication on-off valve 66 opened. With this operation, the hydraulic pressures of the wheel cylinders 82FL, 82FR, and 82RL for the front-left, front-right, and rear-left wheels can be controlled by using the pressure-increasing linear control valves 44FR and 44RL and the pressure-decreasing linear control valves 45FR and 45RL in the second control block system. When abnormality occurs in the second control block 102 controlling the hydraulic pressures of the wheel cylinder 82FR for the front-right wheel and the wheel cylinder 82RL for the rear-left wheel, the brake ECU 100 keeps the rear-wheel communication on-off valve 65 and the front-rear communication on-off valve 66 closed, and keeps the front-wheel communication on-off valve 64 opened. With this operation, the hydraulic pressures of the wheel cylinders 82FL and 82FR for the front-left and front-right wheels can be controlled by using the pressure-increasing linear control valve 44FL and the pressure-decreasing linear control valve 45FL in the first control block system, and the hydraulic pressure of the wheel cylinder 82RR for the rear-right wheel can be controlled by using the pressure-increasing linear control valve 44RR and the pressure-decreasing linear control valve 45RR.

Figure 10:
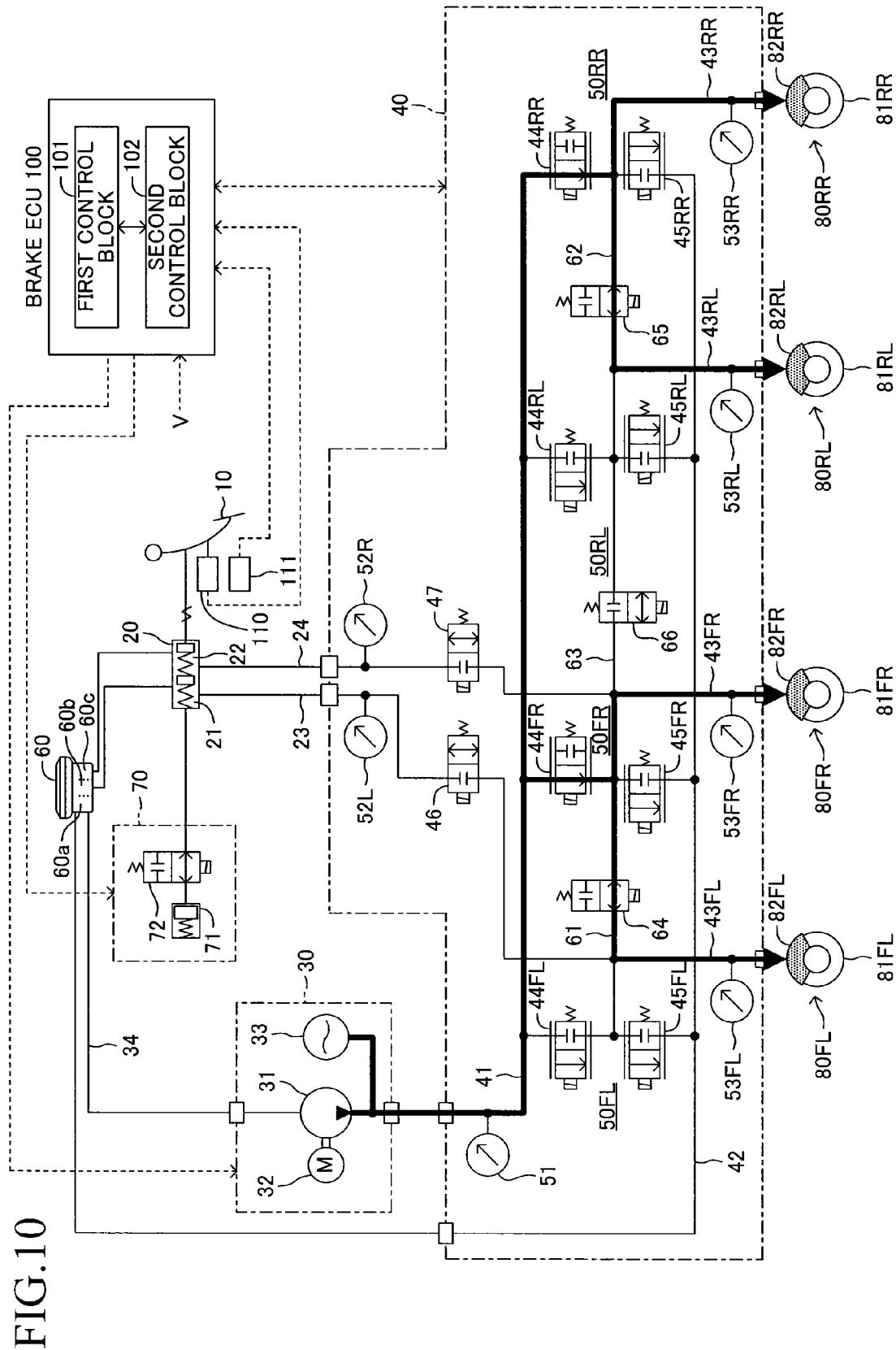
FIG. 10 is an explanatory view illustrating an example of a flow path of operating fluid upon a pressure increase in a partial communication mode.
Figure 11:
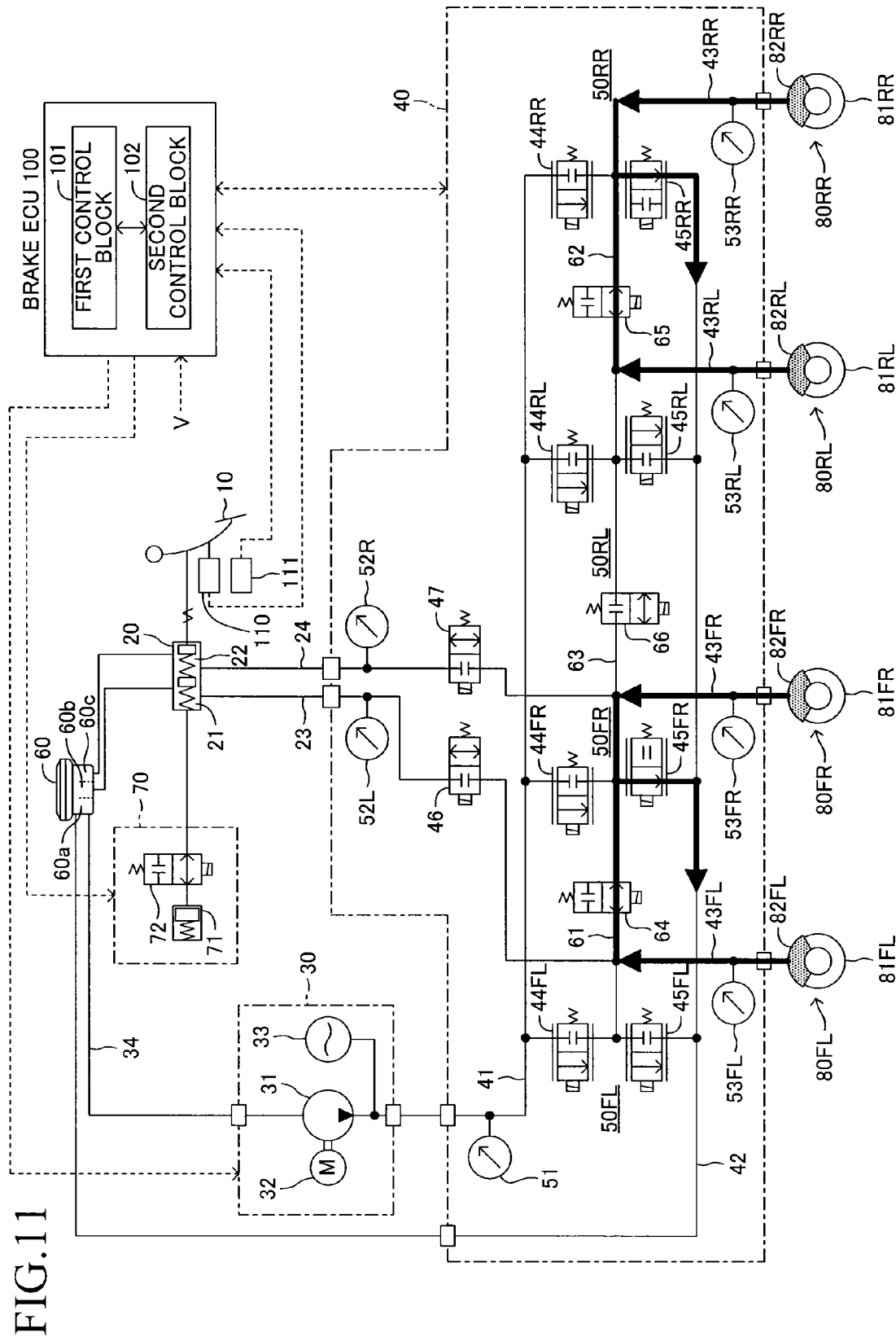
FIG. 11 is an explanatory view illustrating an example of a flow path of operating fluid upon a pressure decrease in a partial communication mode.

In the case where abnormality is detected in one or two of the front-wheel communication on-off valve 64, the rear-wheel communication on-off valve 65, and the front-rear communication on-off valve 66, the brake ECU 100 sets the communication mode to the partial communication mode, since the communication on-off valve from which abnormality is not detected can be kept opened. For example, when abnormality is detected only in the front-rear communication on-off valve 66, the brake ECU 100 stops energization of the front-rear communication on-off valve 66, and keeps the front-wheel communication on-off valve 64 and the rear-wheel communication on-off valve 65 opened as illustrated in FIGS. 10 and 11. With this operation, the wheel cylinders 82FL and 82FR for the front wheels are communicated with each other, and the wheel cylinders 82RL and 82RR for the rear wheels can be communicated with each other.

When determining in step S15 that the partial communication mode cannot be executed, the brake ECU 100 proceeds to step S17 to set the communication mode to the four-wheel separation mode. Therefore, in the case where the condition by which the four-wheel communication mode or the partial communication mode is set is not satisfied, the four-wheel separation mode is always set.

For example, when there is a possibility of a leakage of operating fluid, the four-wheel separation mode is set as the communication mode, so long as the detail of the abnormality is not included in the abnormality pattern specified by the partial communication allowable condition. In the case where abnormality is detected in at least one of the power hydraulic pressure generating device 30, the stroke simulator device 70, the master cut valves 46 and 47, the master cylinder pressure sensors 52L and 52R, the accumulator pressure sensor 51, and the pedal stroke sensor 110, the four-wheel separation mode is set as the communication mode. The four-wheel separation mode is of course set in the case where abnormality is detected in all of the pressure-increasing linear control valves 44, in all of the pressure-decreasing linear control valves 45, or in all of the communication on-off valves 64, 65, and 66.

In the four-wheel communication mode or the partial communication mode, all of the pressure-increasing linear control valves 44 or the pressure-decreasing linear control valves 45, which can be controlled, do not have to be simultaneously activated upon controlling the hydraulic pressures of the wheel cylinders 82 that are communicated with one another. Therefore, some of the pressure-increasing linear control valves 44 or some of the pressure-decreasing linear control valves 45 can be deactivated. With this, the number of the linear control valves to be activated can be reduced to reduce the occurrence of an operating noise. Even when abnormality occurs in some of the pressure-increasing linear control valves 44 or some of the pressure-decreasing linear control valves 45, the hydraulic control for all of the wheel cylinders 82 can be continued by using the pressure-increasing linear control valve 44 or the pressure-decreasing linear control valve 45 from which abnormality is not detected. Thus, capability to cope with the failure of the linear control valves can be enhanced.

The brake ECU 100 repeatedly executes the communication control routine described above in a predetermined short cycle. Therefore, the set communication mode is maintained, regardless of whether the brake pedal operation is performed or not.

<Selection of Linear Control Valve>

Figure 3:
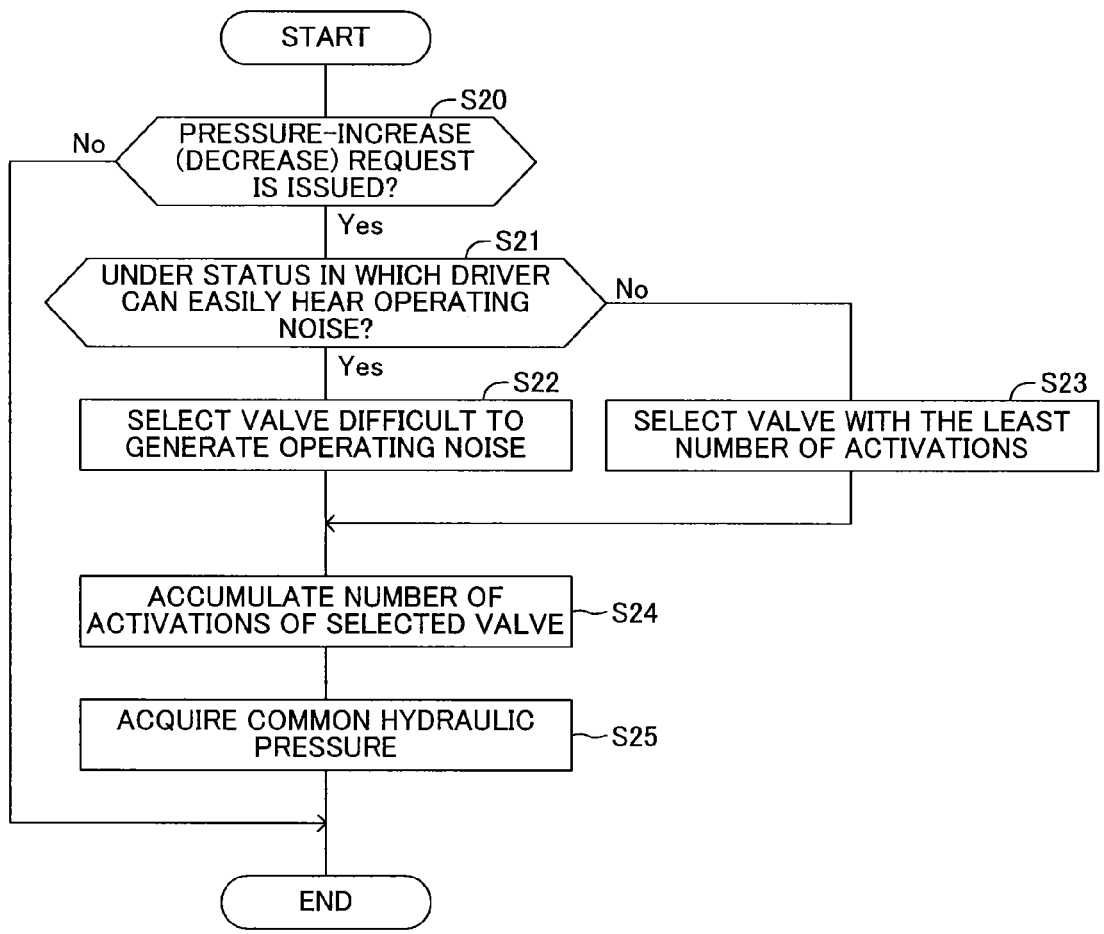
FIG. 3 is a flowchart illustrating a valve selection control routine.

A method of selecting the pressure-increasing linear control valve 44 and the pressure-decreasing linear control valve 45 to be activated will be described. FIG. 3 illustrates a valve selection control routine executed by the microcomputer in the brake ECU 100. The microcomputer in the first control block 101 and the microcomputer in the second control block 102, which share information with each other, execute the valve selection control routine in cooperation with each other. However, it may be configured such that the microcomputer in either one of the control blocks preferentially executes this routine, and when something abnormal occurs in this control block, the microcomputer in the other control block executes this routine. Alternatively, a microcomputer exclusively used for the valve selection control may be provided, and this microcomputer exclusively used for the valve selection control may acquire information from the microcomputer in the first control block and the microcomputer in the second control block to execute the valve selection control routine.

The valve selection control routine is repeatedly executed in a predetermined short cycle in parallel with the communication control routine, when the communication mode is set to the four-wheel communication mode or to the partial communication mode. Here, the valve selection control routine will be described, supposing that the communication mode is set to the four-wheel communication mode. However, the similar process may be basically executed in the partial communication mode. The valve selection routine includes not only a process of selecting the pressure-increasing linear control valve 44 and the pressure-decreasing linear control valve 45 to be activated, but also a process of setting a hydraulic-pressure detection value used for the hydraulic control.

Firstly, the brake ECU 100 determines whether a pressure-increase request or a pressure-decrease request is outputted or not in step S20. The brake ECU 100 outputs a pressure-increase request in the case where the deviation (P*−Pw) between the target hydraulic pressure P* and the wheel cylinder pressure Pw is larger than a pressure-increase start threshold value during the execution of the hydraulic control of the wheel cylinder 82, and sets a target current of the pressure-increasing linear control valve 44 according to this deviation. In the case where the deviation (P*−Pw) between the target hydraulic pressure P* and the wheel cylinder pressure Pw is negative, the brake ECU 100 outputs a pressure-decrease request, and sets a target current of the pressure-decreasing linear control valve 45 according to this deviation, when the absolute value of the deviation is larger than a pressure-decrease start threshold value. The determination in step S20 is made by reading an instruction signal (pressure-increase request, pressure-decrease request) used in this hydraulic control.

When the pressure-increase request or the pressure-decrease request is not outputted, the brake ECU 100 ends the valve selection control routine. The valve selection control routine is repeatedly executed in a predetermined cycle. When the pressure-increase request or the pressure-decrease request is outputted in the repeatedly executed routine (S20: Yes), the brake ECU 100 determines in step S21 whether or not a driver is in a status in which he/she can easily hear an operating noise caused upon opening the linear control valve (the pressure-increasing linear control valve in the case of the pressure-increase request, the pressure-decreasing linear control valve in the case of the pressure-decrease request; they are referred to as the linear control valve 44 (45) below). In the present embodiment, the brake ECU 100 acquires vehicle speed information, and compares a speed V at this time and a threshold value Vref set beforehand. When the speed V is lower than the threshold value Vref, the brake ECU 100 determines that the driver is in a status in which he/she can easily hear the operating noise.

When determining that the driver is in the status in which he/she can easily hear the operating noise (S21: Yes), the brake ECU 100 selects the linear control valve 44 (45) that is difficult to generate an operating noise in step S22. The brake ECU 100 stores beforehand operating-noise information indicating which one of the four pressure-increasing linear control valves 44 and the four pressure-decreasing linear control valves 45 is difficult to generate an operating noise, and selects one linear control valve that is difficult to generate an operating noise out of the usable linear control valves 44 (45). For example, a normally closed solenoid linear control valve is more likely to generate an operating noise than a normally opened solenoid linear control valve. Therefore, out of the pressure-decreasing linear control valves 45, the pressure-decreasing linear control valves 45RL and 45RR for the rear-left and rear-right wheels correspond to a linear control valve that is difficult to generate an operating noise. In this case, either one of the pressure-decreasing linear control valves 45RL and 45RR may be selected in step S22. For example, the pressure-decreasing linear control valve 45RL and the pressure-decreasing linear control valve 45RR may alternately be selected every brake pedal operation.

The degree of an operating noise may be different depending on the length and disposed position of the individual passage 43 that is a hydraulic pressure passage from the liner control valve 44 (45) to the wheel cylinder 82. Therefore, which one of the four pressure-increasing linear control valves 44 that are a normally closed type is difficult to generate an operating noise can preliminarily be set. As for the pressure-increasing linear control valves 44, a valve that is difficult to generate an operating noise may not be set. Under the situation in which the pressure-increase request is outputted in this case, the brake ECU 100 may proceed to step S23 without making the determination about a status in step S21.

When determining in step S21 that the driver is not in the status in which he/she can easily hear an operating noise, the brake ECU 100 selects a valve, which is activated the least number of times, out of the usable linear control valves 44 (45) in step S23. The brake ECU 100 stores the accumulating number of activations in a non-volatile memory (not illustrated) for each linear control valve 44 (45) in step S24 described later. Therefore, in step S23, the brake ECU 100 reads the stored number of activations to select a linear control valve 44 (45) that can be used and that has the least number of activations. The number of activations may be defined as a number of times of opening the linear control valve 44 (45). When only one usable linear control valve 44 (45) (from which abnormality is not detected) is present, this linear control valve 44 (45) is selected in steps S22 and S23.

The linear control valve 44 (45) thus selected is activated as a control valve for performing the hydraulic control, while the non-selected linear control valves are deactivated.

The brake ECU 100 repeats the valve selection control routine in a predetermined short cycle, and during a period in which the pressure-increase request or a pressure-decrease request is outputted, the brake ECU 100 controls not to change the selected linear control valve 44 (45) during this period. Alternatively, during the period in which one brake operation is performed, the brake ECU 100 may control not to change the selected linear control valve 44 (45) during this period.

After selecting one of the linear control valves 44 (45) in step S22 or in step S23, the brake ECU 100 increments the number of activations of the selected linear control valve 44 (45) by "1", and stores the updated number of activations. The brake ECU 100 repeatedly performs the valve selection control routine in a predetermined short cycle, but after the number of activations is updated, the brake ECU 100 prevents this number of activations from being updated until this linear control valve 44 (45) is closed, i.e., until the output of the pressure-increase request or the pressure-decrease request is stopped. With this, the number of activations of the linear control valve 44 (45) can appropriately be accumulated.

Then, in step S25, the brake ECU 100 reads detection values of the usable hydraulic pressure sensors 53 (all hydraulic pressure sensors 53 from which abnormality is not detected), and acquires the common hydraulic pressure of the respective wheel cylinders 82 by using these detection values. This common hydraulic pressure indicates a common wheel cylinder pressure Pw used for the hydraulic control of the wheel cylinders 82 that are communicated with one another. The brake ECU 100 calculates an average value of the detection values of the usable hydraulic pressure sensors 53, for example, and sets the result of the calculation as a common hydraulic pressure. Alternatively, the brake ECU 100 calculates an average value of the detection values, excluding the maximum value and the minimum value, of the usable hydraulic pressure sensors 53, and sets the result of the calculation as a common hydraulic pressure.

After executing the process in step S25, the brake ECU 100 ends the valve selection control routine. The brake ECU 100 then repeatedly executes the valve selection control routine in a predetermined cycle.

<First Modification of the Valve Selection Control Routine>

Figure 4:
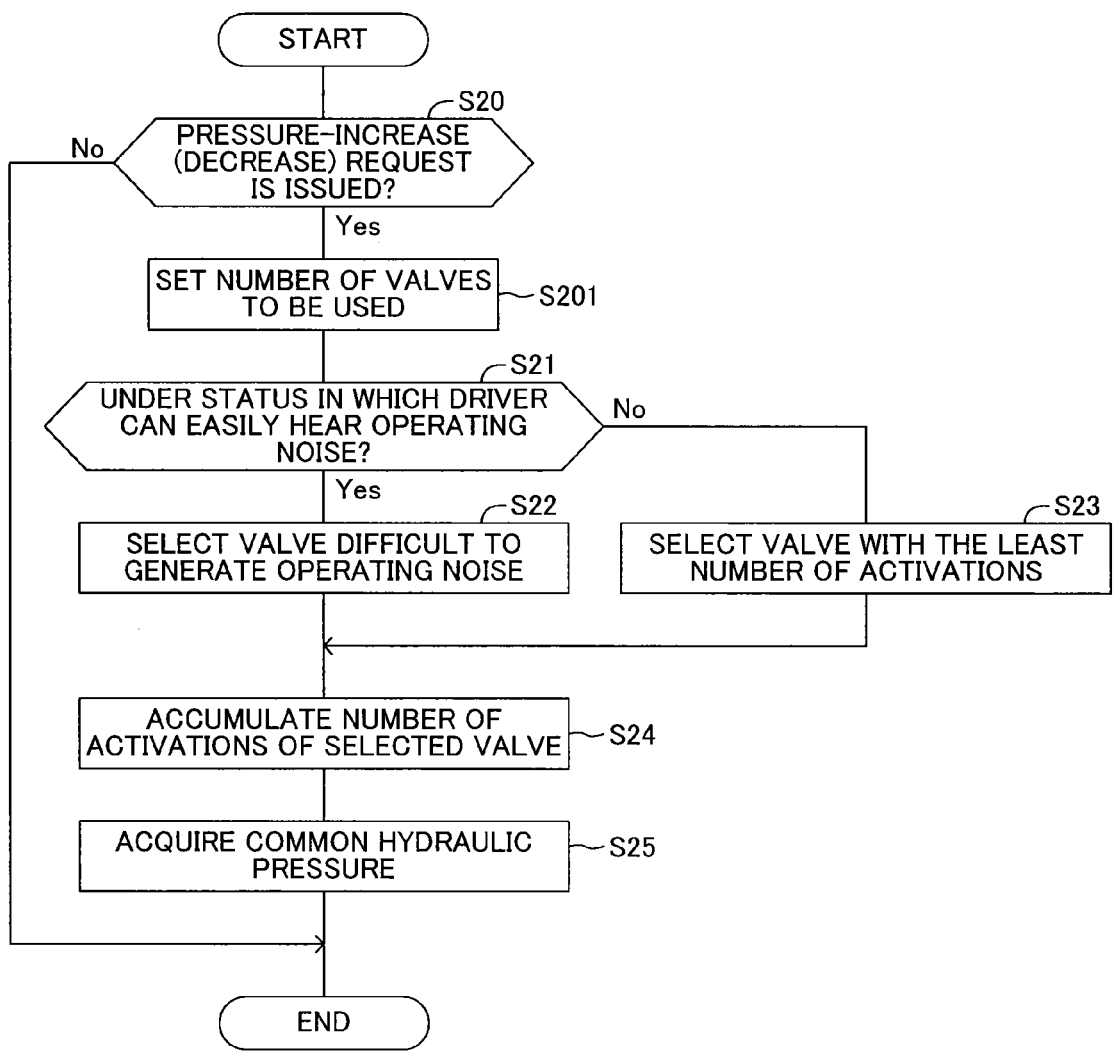
FIG. 4 is a flowchart illustrating a modification of the valve selection control routine.

In the valve selection control routine described above, one of the pressure-increasing linear control valves 44 and one of the pressure-decreasing linear control valves 45 are activated. However, plural valves may be used in combination. For example, as illustrated in FIG. 4, a number-of-valves-to-be-used setting process (step S201) may be added between step S20 and step S21. It is preferable that the number of linear control valves 44 (45) to be used is increased, as the total necessary flow rate of the operating fluid supplied to the respective wheel cylinders 82 from the power hydraulic pressure generating device 30 is larger. Therefore, in the number-of-valves-to-be-used setting process in step S201, the number of linear control valves 44 (45) to be used is increased, as the absolute value of the deviation (P*−Pw) between the common target hydraulic pressure P* and the common hydraulic pressure Pw is larger. The brake ECU 100 stores beforehand association information by which the absolute value of the deviation (P*−Pw) and the number of linear control valves 44 (45) to be used are associated with each other. In step S201, the brake ECU 100 reads the deviation (P*−Pw) calculated during the hydraulic control, and sets the number of linear control valves 44 (45) to be used corresponding to the deviation (P*−Pw) by referring to the association information. In step S22, the brake ECU 100 selects the linear control valves 44 (45) to be used in the number set as described above in such a manner that the selected linear control valves preferentially include the linear control valve 44 (45) that is difficult to generate an operating noise. In step S23, the brake ECU 100 selects the linear control valves 44 (45) in the number set as described above in such a manner that the selected linear control valves preferentially include the linear control valve 44 (45) with less number of activation, i.e., the brake ECU 100 selects the linear control valves 44 (45) in ascending order in the number of activation.

<Second Modification of Valve Selection Control Routine>

In the valve selection control routine described above, the number of activations of the linear control valve 44 (45) is equalized. However, instead of this configuration, the activation time of the linear control valve 44 (45) may be equalized. In this case, the brake ECU 100 selects a linear control valve having the minimum activation time from the usable linear control valves 44 (45) in step S23, and in step S24, the brake ECU 100 increments the activation time of the selected linear control valve 44 (45) by "1", and stores this updated value. In this case, the brake ECU 100 may increment this activation time during the period in which the pressure-increase request or the pressure-decrease request is outputted.

<Third Modification of Valve Selection Control Routine>

In the above valve selection control routine, the brake ECU 100 calculates a common hydraulic pressure by using the detection values of plural usable hydraulic pressure sensors 53 in step S25. However, it is not always necessary to calculate a common hydraulic pressure from the detection values of plural hydraulic pressure sensors 53. For example, a detection value of any one of the hydraulic pressure sensors may be set as a common hydraulic pressure. In this case, a detection value of a hydraulic pressure sensor 53 different from the hydraulic pressure sensor for the wheel corresponding to the linear control valve 44 (45) to be activated may be set as a common hydraulic pressure. For example, the detection value of the hydraulic pressure sensor 53 provided most apart from the linear control valve 44 (45) to be activated may be set as a common hydraulic pressure. The detection value of the hydraulic pressure sensor 53 provided most apart from the linear control valve 44 (45) is likely to be a small value during an increase in pressure. Therefore, braking force can surely be generated by setting this detection value as a common hydraulic pressure.

<Hydraulic Control>

When performing the hydraulic control for the wheel cylinders 82 in the four-wheel communication mode, the brake ECU 100 activates only the linear control valve 44 (45) selected in step S22 or step S23 to set a target current i* of the linear control valve 44 (45) so as to allow the common hydraulic pressure Pw set in step S25 to follow the common hydraulic pressure P*. For example, a target current ia* of the pressure-increasing linear control valve 44 during an increase in pressure is calculated by adding a value, which is obtained by multiplying a deviation between the common target hydraulic pressure P* and the common hydraulic pressure Pw by a feedback gain Gfba, to a valve-opening current i open a of the pressure-increasing linear control valve 44 to be activated (ia*=i open a+Gfba·(P*−Pw)). A target current ib* of the pressure-decreasing linear control valve 45 during a decrease in pressure is calculated by adding a value, which is obtained by multiplying a deviation between the common target hydraulic pressure P* and the common hydraulic pressure Pw by a feedback gain Gfbb, to a valve-opening current i open b of the pressure-decreasing linear control valve 45 to be activated (ib*=i open b+Gfbb·(P*−Pw)). These feedback gains Gfba and Gfbb are set to be different values for the feedback gains for independently controlling the hydraulic pressure of each of four wheels. Specifically, when the hydraulic pressures of the wheel cylinders 82 of four wheels are controlled by activating some of the linear control valves 44 (45), the flow rate of the operating fluid flowing from the linear control valve 44 (45) is increased, and therefore, the feedback gains Gfba and Gfbb according to this flow rate are set. For the calculation of the target current, a feed forward control may be employed, instead of the feedback control. Alternatively, the feedback control and the feed forward control may be combined.

<Flow Path of Operating Fluid>

In the four-wheel communication mode, the hydraulic pressures of all wheel cylinders 82 are commonly controlled by the energization control of some of the linear control valves 44 (45). The flow path of the operating fluid in the four-wheel communication mode will be described. FIG. 6 illustrates a flow path of operating fluid when the hydraulic control (for pressure-increase) is executed in the four-wheel communication mode. This case illustrates a flow path upon increasing the hydraulic pressure of each wheel cylinder 82 by using only the pressure-increasing linear control valve 44FR for the front-right wheel. FIG. 7 illustrates a flow path of operating fluid when the hydraulic control (for pressure-decrease) is executed in the four-wheel communication mode. This case illustrates a flow path upon decreasing the hydraulic pressure of each wheel cylinder 82 by using only the pressure-decreasing linear control valve 45RL for the rear-left wheel. As described above, in the four-wheel communication mode, the hydraulic pressures of the wheel cylinders 82 are controlled by the linear control valve 44 (45) selected in the valve selection control routine.

Even in the partial communication mode, the hydraulic pressures can be controlled by the linear control valves 44 (45) in the number less than the number of the wheel cylinders 82. For example, when abnormality occurs in the first control block 101 controlling the hydraulic pressures of the wheel cylinder 82FL for the front-left wheel and the wheel cylinder 82RR for the rear-right wheel, the wheel cylinder 82RR for the rear-right wheel is excluded from the subject to which the hydraulic control is performed, and the rear-wheel communication on-off valve 65 is kept closed. In this case, upon increasing a pressure, the brake ECU 100 increases the hydraulic pressures of the three wheel cylinders 82FL, 82FR, and 82RL by using the pressure-increasing linear control valve 44RL (44FR may be used) that is one of the pressure-increasing linear control valves in the second control block 102 as illustrated in FIG. 8, and upon decreasing a pressure, the brake ECU 100 decreases the hydraulic pressures of the three wheel cylinders 82FL, 82FR, and 82RL by using the pressure-decreasing linear control valve 45RL (45FR may be used) that is one of the pressure-decreasing linear control valves in the second control block 102 as illustrated in FIG. 9.

When abnormality is detected in only the front-rear communication on-off valve 66, for example, the brake ECU 100 increases the hydraulic pressures of the wheel cylinders 82FL and 82FR for the front wheels by using the pressure-increasing linear control valve 44FR (44FL may be used), and increases the hydraulic pressures of the wheel cylinders 82RL and 82RR for the rear wheels by using the pressure-increasing linear control valve 44RR (44RL may be used) as illustrated in FIG. 10, during a pressure increase. During a pressure decrease, the brake ECU 100 decreases the hydraulic pressures of the wheel cylinders 82FL and 82FR for the front wheels by using the pressure-decreasing linear control valve 45FR (45FL may be used), and decreases the hydraulic pressures of the wheel cylinders 82RL and 82RR for the rear wheels by using the pressure-decreasing linear control valve 45RR (45RL may be used) as illustrated in FIG. 11.

In the four-wheel separation mode, all of the front-wheel communication on-off valve 64, the rear-wheel communication on-off valve 65, and the front-rear communication on-off valve 66 are kept closed. For example, when abnormality is not detected in the brake control device, and the target hydraulic pressures of the four wheel cylinders 82 are not set to be the same value, the brake ECU 100 increases the hydraulic pressures of the four wheel cylinders 82 by individually controlling the four pressure-increasing linear control valves 44 during a pressure increase as illustrated in FIG. 12, and during a pressure decrease, the brake ECU 100 decreases the hydraulic pressures of the four wheel cylinders 82 by individually controlling the four pressure-decreasing linear control valves 45 as illustrated in FIG. 13.

Figure 14:
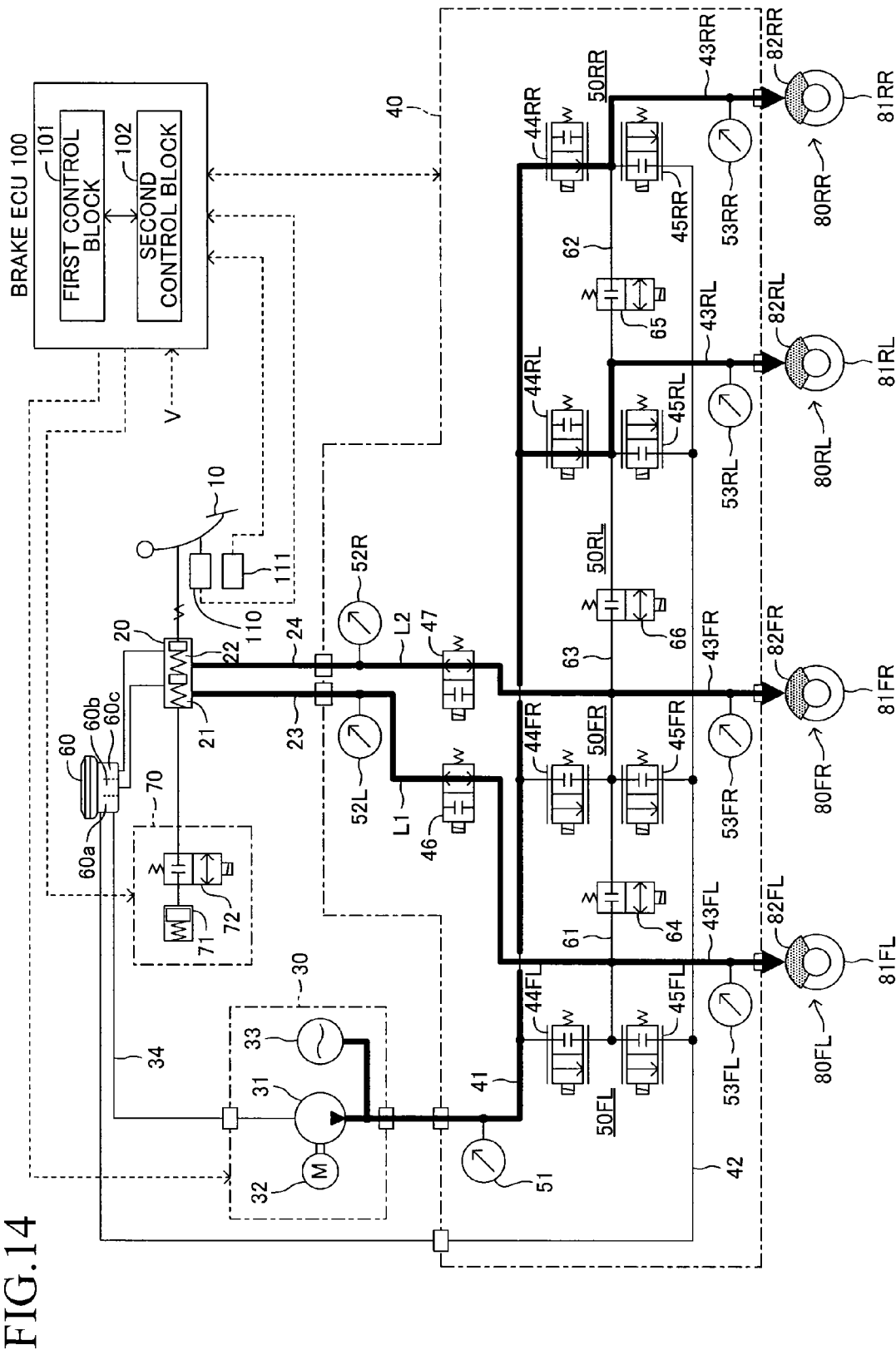
FIG. 14 is an explanatory view illustrating an example of a flow path of operating fluid upon a pressure increase when a leakage of operating fluid is detected.

When there is a possibility of a leakage of operating fluid, the communication mode is set to the four-wheel separation mode, so long as the wheel cylinder 82 from which the operating fluid leaks cannot be specified. In this case, the brake ECU 100 opens the master cut valves 46 and 47 as illustrated in FIG. 14. With this, the wheel cylinder 82FL for the front-left wheel and the pressure chamber 21 are communicated with each other, and the wheel cylinder 82FR for the front-right wheel and the pressure chamber 22 are communicated with each other. The brake ECU 100 also keeps the pressure-increasing linear control valves 44FL and 44FR and the pressure-decreasing linear control valves 45FL and 45FR closed. Thus, a pedal effort hydraulic path L1 composed of the master passage 23 and the individual passage 43FL are opened, and a pedal effort hydraulic path L2 composed of the master passage 24 and the individual passage 43FR is opened. These pedal effort hydraulic paths L1 and L2 are isolated from the other paths, and forms an independent brake system. The brake ECU 100 also closes the simulator cut valve 72. With this, the master cylinder 20 generates a hydraulic pressure (pedal effort hydraulic pressure) by using driver's depression force of the brake pedal, and this hydraulic pressure is supplied to the wheel cylinders 82FL and 82FR for the front wheels, whereby braking force according to the driver's brake pedal operation can be generated. The brake ECU 100 also executes the hydraulic control for the wheel cylinders 82RL and 82RR for the rear wheels by activating the pressure-increasing linear control valves 44RL and 44RR and the pressure-decreasing linear control valves 45RL and 45RR. FIG. 14 illustrates the flow of operating fluid during the pressure increase. During the pressure decrease, the operating fluid is returned to the pressure chambers 21 and 22 from the wheel cylinders 82FL and 82FR for the front wheels, and the operating fluid is returned to the return passage 42 from the wheel cylinders 82RL and 82RR for the rear wheels via the pressure-decreasing linear control valves 45RL and 45RR.

The three brake systems can be separated from one another by forming the flow paths of the operating fluid as described above. Accordingly, even if a leakage of operating fluid occurs in only one brake system, the other brake systems can be prevented from being affected by this leakage.

Figure 15:
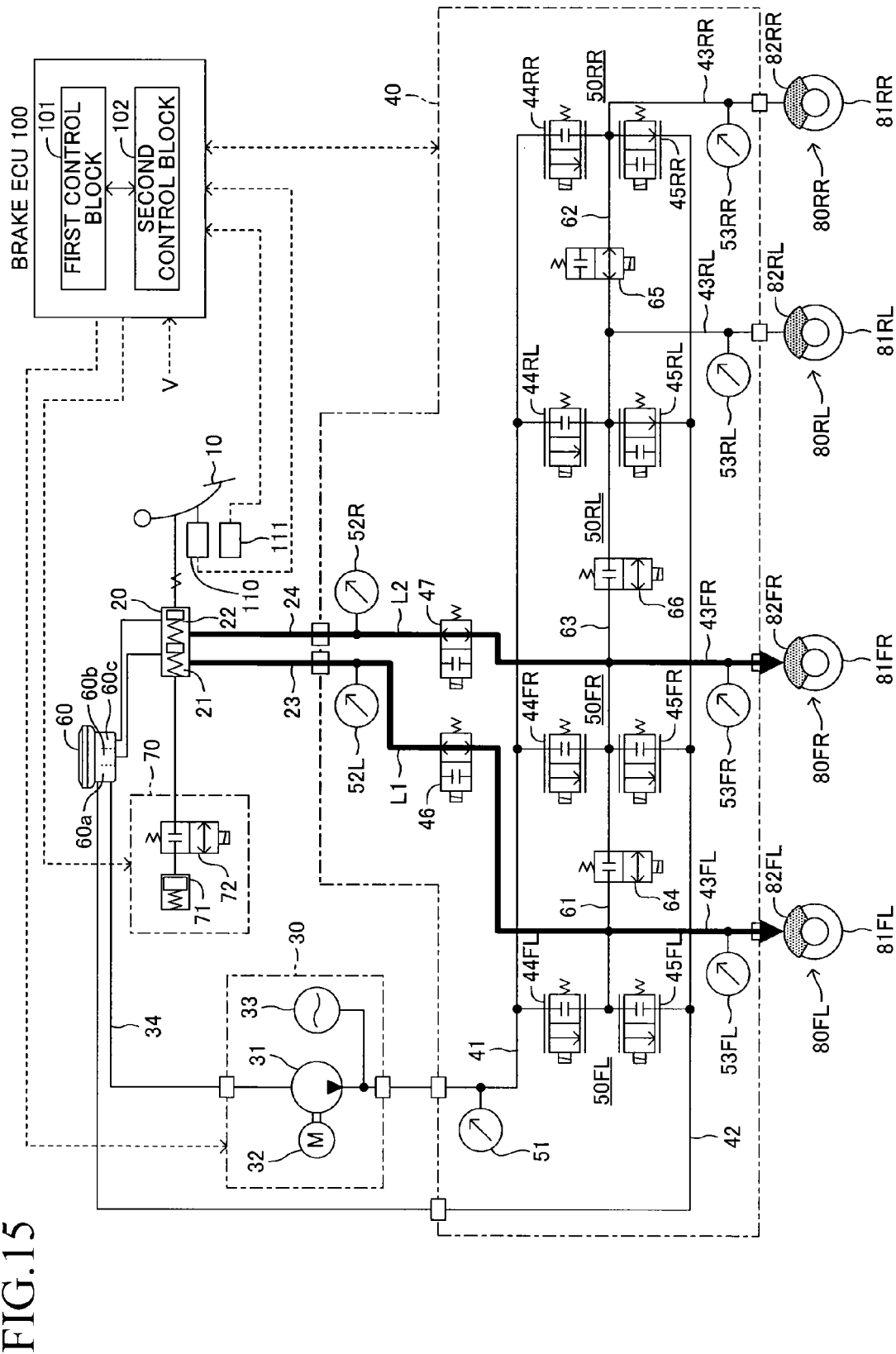
FIG. 15 is an explanatory view illustrating an example of a flow path of operating fluid upon a pressure increase when a hydraulic control is stopped due to abnormality in a control system.

When the hydraulic control is disabled due to abnormality in the control system, energization of all electric actuators (control valves, motors) is stopped. In this case, as illustrated in FIG. 15, the master cut valves 46 and 47 that are a normally opened valve are opened to open the pedal effort hydraulic path L1 composed of the master passage 23 and the individual passage 43FL and the pedal effort hydraulic path L2 composed of the master passage 24 and the individual passage 43FR. These two pedal effort hydraulic paths L1 and L2 are isolated from the other paths, and each of them forms an independent brake system, since all valves (pressure-increasing linear control valves 44FL and 44FR, the pressure-decreasing linear control valves 45FL and 45FR, the front-wheel communication on-off valve 64, and the front-rear communication on-off valve 66) leading into each of the paths L1 and L2 are a normally closed valve.

With this state, the master cylinder 20 generates a hydraulic pressure (pedal effort hydraulic pressure) by using driver's depression force of the brake pedal, and this hydraulic pressure is supplied to the wheel cylinders 82FL and 82FR for the front wheel, whereby braking force according to the driver's brake pedal operation can be generated.

<Setting of Manner of on-Off Valves Provided on Communication Passages>

In the brake control device according to the present embodiment, a normally closed solenoid valve is used for the front-wheel communication on-off valve 64 provided on the front-wheel left-right communication passage 61 and the front-rear communication on-off valve 66 provided on the front-rear communication passage 63. Therefore, the pedal effort hydraulic path L1 and the pedal effort hydraulic path L2 can be kept in the state in which they are neither communicated with each other nor communicated with the other passages for the operating fluid, when the brake control device is not started, when the hydraulic control cannot be executed due to abnormality generated in the brake control device, or when the leakage of operating fluid is detected.

For example, when the leakage of the operating fluid occurs on the pedal effort hydraulic path L1, the front-wheel communication on-off valve 64 is kept closed, so that the operating fluid in the other pedal effort hydraulic path L2 does not flow into the pedal effort hydraulic path L1 having the leakage of the operating fluid. Therefore, the operating fluid in the storage chamber 60b for supplying the operating fluid to the pedal effort hydraulic path L1, out of the three storage chambers 60a, 60b, and 60c provided in the reservoir 60, is decreased, but the decrease in the operating fluid in the other storage chambers 60a and 60c can be prevented. Accordingly, the wheel cylinder 82FR for one of the front-left and front-right wheels can be kept in the state in which it can generate braking force. Especially since the front wheels more largely contribute to braking than the rear wheels, it is extremely effective to keep the wheel having no leakage of operating fluid in the state in which it can be stopped. If a normally opened solenoid valve is used for the front-wheel communication on-off valve 64, the operating fluid in the pedal effort hydraulic path L2 flows into the pedal effort hydraulic path L1 having the leakage of operating fluid. Therefore, the operating fluid in not only the storage chamber 60*b* but also in the storage chamber 60*c* for supplying the operating fluid into the pedal effort hydraulic path L2 is decreased.

Even when the leakage of operating fluid occurs on the wheel cylinder 82RL for one of the rear wheels or its individual passage 43RL, for example, the front-rear communication on-off valve 66 keeps closed, so that the operating fluid in the pedal effort hydraulic path L2 is not flown into the individual passage 43RL. Accordingly, the leakage of operating fluid in the brake system for the rear wheels does not affect the pedal effort hydraulic circuits L1 and L2. This can prevent the decrease in the operating fluid in the pedal effort hydraulic circuits L1 and L2. As a result, the state in which the pedal effort hydraulic pressure can be supplied to the wheel cylinders 82FL and 82FR for the front wheels that largely contribute to braking can be maintained.

On the other hand, a normally opened solenoid valve is used for the rear-wheel communication on-off valve 65 provided on the rear-wheel left-right communication passage 62. Therefore, power is not consumed for keeping the rear-wheel communication on-off valve 65 opened during the normal brake control. Especially in the present embodiment, the four-wheel communication mode or the partial communication mode is continued regardless of the brake pedal operation, whereby the effect of reducing power consumption is high. The brake control device can also solve the trouble caused by the leakage of operating fluid. For example, even when the leakage of operating fluid occurs on the wheel cylinder 82RL for one of the rear-left and rear-right wheels, or its individual passage 43RL, the pressure-increasing linear control valves 44RL and 44RR are kept closed when the brake ECU 100 is not started or when the hydraulic control is not executed. Accordingly, the operating fluid is not supplied to the wheel cylinders 82 for the respective wheels from the power hydraulic pressure generating device 30. Consequently, the leaked amount of the operating fluid is small, whether the rear-wheel communication on-off valve 65 is opened or closed. During the hydraulic control, the leaked amount of the operating fluid is not affected by the open/close state of the rear-wheel communication on-off valve 65. For this, a normally opened solenoid valve is used for the rear-wheel communication on-off valve 65.

<Operation and Effect of Embodiments>

The vehicle brake control device according to the embodiments of the present invention described above provides operation and effects described below.

1. The wheel cylinders 82 for four wheels are kept communicated with one another during a normal brake control. With this configuration, the hydraulic pressures of the wheel cylinders 82 for four wheels can be controlled by deactivating some of the linear control valves 44 (45) and activating the remaining linear control valves 44 (45). This configuration can reduce the number of occurrence of an operating noise from all linear control valves 44 (45). In addition, the number of the wheel cylinders 82 to be controlled becomes larger than the number of the linear control valves 44 (45) to be activated. Therefore, the amount of operating fluid absorbing the pulsation in the operating fluid generated upon opening the valve is increased, whereby loudness of the operating noise can be reduced. When it is determined that a driver is in the status in which he/she can easily hear an operating noise, the linear control valve 44 (45) is switched to the one, which is set beforehand and which is difficult to generate the operating noise, whereby uncomfortable feeling caused by the activation of the linear control valves 44 (45) and provided to the driver can be reduced. Consequently, quietness during the normal brake control can be enhanced.

2. Even when abnormality is detected in some of the linear control valves 44 (45), the four-wheel communication mode is continued, or the communication mode is switched to the partial communication mode according to the abnormal portion. Therefore, the hydraulic control can be continued by using the linear control valves 44 (45) other than the linear control valve 44 (45) from which abnormality is detected. Even when abnormality is detected in some of the hydraulic pressure sensors 53, the four-wheel communication mode is continued. Therefore, the hydraulic control can be continued by using the hydraulic pressure sensor 53 other than the hydraulic pressure sensor 53 from which abnormality is detected. With this, capability to cope with failure can be enhanced. In addition, quietness can also be enhanced during the hydraulic control for the wheel cylinders 82 in this case.

3. Even when abnormality is detected in one or two of the front-wheel communication on-off valve 64, the rear-wheel communication on-off valve 65, and the front-rear communication on-off valve 66, the partial communication mode is set. Therefore, the number of the linear control valves 44 (45) to be activated can be reduced, resulting in that the number of occurrences of the operating noise can be reduced. Even when abnormality is detected in some of the linear control valves 44 (45), the hydraulic control can be continued by using the linear control valves 44 (45) other than the linear control valve 44 (45) from which the abnormality is detected.

4. In the four-wheel communication mode or the partial communication mode, the linear control valve 44 (45) to be activated is selected such that the number of activations or activation time is equalized. Therefore, the life of the linear control valves 44 (45) can appropriately be prolonged as a whole.

5. The brake control device is configured to acquire a common hydraulic pressure of the wheel cylinders 82 by using the detection values of the plural hydraulic pressure sensors 53. Therefore, even if each of the detection values varies, an appropriate detection value can be set as the common hydraulic pressure. Accordingly, an accurate hydraulic control can be executed.

6. The front-wheel communication on-off valve 64 and the front-rear communication on-off valve 66, which are provided on the communication passage allowing communication among the four wheel cylinders 82, are a normally closed solenoid valve, while the rear-wheel communication on-off valve 65 is a normally opened solenoid valve. Therefore, the brake control device can solve the trouble caused by a leakage of operating fluid as well as reduce power consumption.

7. The front-rear communication passage 63 is formed to allow communication between the wheel cylinders 82 of the diagonal wheels. This configuration can prevent the generation of a difference between the hydraulic pressures of the wheel cylinders 82 for the left and right wheels.

While the vehicle brake control device according to the embodiments of the present invention has been described, the present invention is not limited to the above embodiments, and various modifications are possible without departing from the spirit of the invention.

Figure 16:
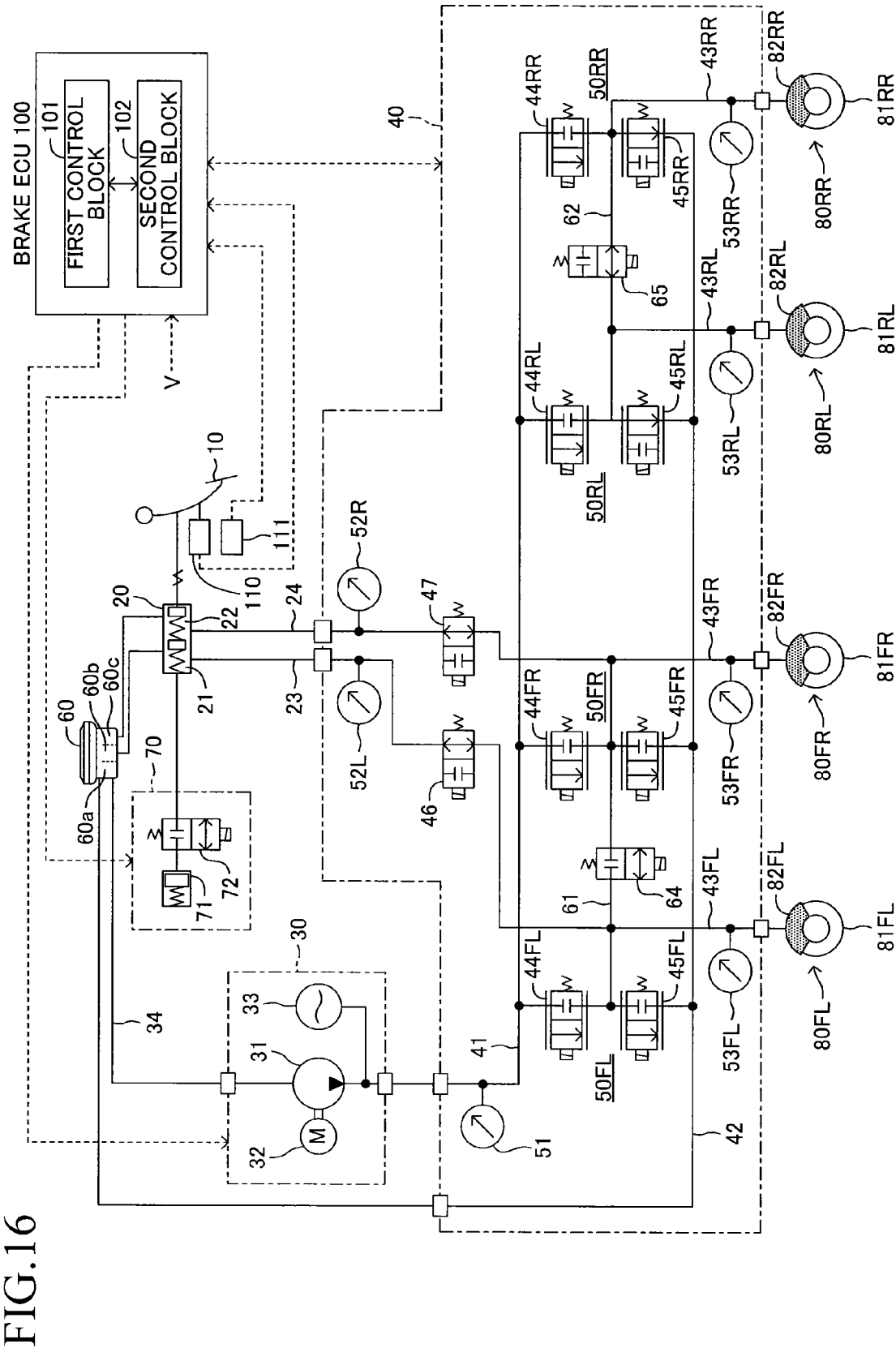
FIG. 16 is a diagram illustrating a schematic system configuration of a vehicle brake control device according to a modification.

For example, in the present embodiments, the wheel cylinders 82 for the front-left, front-right, rear-left, and rear-right wheels are communicated with one another. However, the present embodiments may be configured such that at least the wheel cylinders 82FL and 82FR for the front-left and front-right wheels may be communicated with each other, and the wheel cylinders 82RL and 82RR for the rear-left and rear-right wheels may be communicated with each other. For example, as illustrated in FIG. 16, the front-rear communication passage 63 and the front-rear communication on-off valve 66 in the above embodiments may be eliminated. In this configuration illustrated in FIG. 16, the hydraulic control can also be performed by keeping the front-wheel communication on-off valve 64 and the rear-wheel communication on-off valve 65 opened and setting the communication mode to the partial communication mode. In this case, the hydraulic pressures of the wheel cylinders 82FL and 82FR for the front wheels can be controlled by deactivating the pressure-increasing linear control valve 44FL (44FR) and the pressure-decreasing linear control valve 45FL (45FR) for one of the front-left wheel and the front-right wheel, and activating the pressure-increasing linear control valve 44FR (44FL) and the pressure-decreasing linear control valve 45FR (45FL) for the other wheel. Further, the hydraulic pressures of the wheel cylinders 82RL and 82RR for the rear wheels can be controlled by deactivating the pressure-increasing linear control valve 44RL (44RR) and the pressure-decreasing linear control valve 45RL (45RR) for one of the rear-left wheel and the rear-right wheel, and activating the pressure-increasing linear control valve 44RR (44RL) and the pressure-decreasing linear control valve 45RR (45RL) for the other wheel. With this, quietness during the normal brake control can be enhanced. Since the front-wheel communication on-off valve 64 is a normally opened solenoid valve, and the rear-wheel communication on-off valve 65 is a normally closed solenoid valve, the brake control device can solve a problem caused by a leakage of operating fluid as well as reduce power consumption.

In the configuration illustrated in FIG. 16, the partial communication mode and the four-wheel separation mode may selectively be switched as in the embodiments. Specifically, when the target hydraulic pressures of the respective wheel cylinders 82 are not the same, or when abnormality is detected in the brake control device, the communication mode may be set to the four-wheel separation mode to close the front-wheel communication on-off valve 64 and the rear-wheel communication on-off valve 65. On the other hand, during the normal brake control in which the target hydraulic pressures of the respective wheel cylinders 82 are the same, and no abnormality is detected, the communication mode may be set to the partial communication mode to open the front-wheel communication on-off valve 64 and the rear-wheel communication on-off valve 65. Only the wheel cylinders 82FL and 82FR for the front wheels may be communicated with each other, or only the wheel cylinders 82RL and 82RR for the rear wheels may be communicated with each other, according to the detail of the detected abnormality. In addition, upon selecting the linear control valve 44 (45) to be activated when the partial communication mode is set, the linear control valve 44 (45) with the less number of activations (or less activation time) may be preferentially used, or the linear control valve 44 (45), which is set beforehand and which is difficult to generate an operating noise, may be preferentially used in the case where the driver is determined to be in a status in which he/she can easily hear an operating noise, as in the embodiments. Further, the set communication mode may be continued not only during the hydraulic control but also during the period in which the brake pedal operation is canceled, as in the embodiments.

The present embodiments are configured such that, when the four-wheel communication mode or the partial communication mode is set, both of some of the pressure-increasing linear control valves 44 and some of the pressure-decreasing linear control valves 45 are deactivated. However, the present embodiments may be configured such that only some of the pressure-increasing linear control valves 44 are deactivated, or only some of the pressure-decreasing linear control valves 45 are deactivated.

The present embodiments are configured to continue the set communication mode even after the brake pedal operation is canceled. However, after the brake pedal operation is canceled, energization of the front-wheel communication on-off valve 64, the rear-wheel communication on-off valve 65, and the front-rear communication on-off valve 66 may be stopped.

In the present embodiments, the individual linear control valve device 50 is composed of the pressure-increasing linear control valve 44 and the pressure-decreasing linear control valve 45. However, the individual linear control valve device 50 does not need to have both of the pressure-increasing linear control valve 44 and the pressure-decreasing linear control valve 45. For example, the brake control device can be configured to directly supply the hydraulic pressure outputted from the power hydraulic pressure generating device 30 without having the pressure-increasing linear control valve 44, and to adjust the wheel cylinder pressure with the pressure-decreasing linear control valve 45.

The invention claimed is:
1. A vehicle brake control device including:
wheel cylinders, each of which is provided to each of front-left, front-right, rear-left, and rear-right wheels for receiving a hydraulic pressure of operating fluid to apply braking force to the wheels;
a power hydraulic pressure generating device that generates a hydraulic pressure even if a brake operation is not performed;
individual linear control valve devices, each of which is provided to an individual passage of operating fluid leading into each of the wheel cylinders from the power hydraulic pressure generating device for independently adjusting a hydraulic pressure of each of the wheel cylinders;
a master cylinder that generates a first pedal effort hydraulic pressure and a second pedal effort hydraulic pressure by using a pedal effort caused by a driver's depressing operation on a brake pedal;
a master hydraulic path including a first pedal effort hydraulic pressure path that supplies the first pedal effort hydraulic pressure to the wheel cylinder for either one of the front-left and front-right wheels, and a second pedal effort hydraulic pressure path that supplies the second pedal effort hydraulic pressure to the wheel cylinder for the other front wheel;
a master cut valve device that includes a first on-off valve opening and closing the first pedal effort hydraulic path, and a second on-off valve opening and closing the second pedal effort hydraulic path, the first on-off valve and the second on-off valve being a normally opened valve that keeps opened upon non-energization and is closed by energization; and a hydraulic control unit that controls energization of the individual linear control valve devices to control the hydraulic pressure of each of the wheel cylinders with the first on-off valve and the second on-off valve of the master cut valve device closed, the brake control device comprising:

a front-wheel left-right communication passage that allows communication between the individual passage, which is located between the wheel cylinder for the front-left wheel and the individual linear control valve device, and the individual passage, which is located between the wheel cylinder for the front-right wheel and the individual linear control valve device, via a front-wheel communication on-off valve;

a rear-wheel left-right communication passage that allows communication between the individual passage, which is located between the wheel cylinder for the rear-left wheel and the individual linear control valve device, and the individual passage, which is located between the wheel cylinder for the rear-right wheel and the individual linear control valve device, via a rear-wheel communication on-off valve; and a communication control unit that allows the front-wheel communication on-off valve and the rear-wheel communication on-off valve to be opened during a hydraulic control by the hydraulic control unit, wherein the front-wheel communication on-off valve is a normally closed valve that keeps closed upon non-energization and is opened due to energization, and the rear-wheel communication on-off valve is a normally opened valve that keeps opened upon non-energization and is closed due to energization.

2. A vehicle brake control device according to claim 1, further comprising:

a front-rear communication passage that allows communication between the individual passage, which is located between the wheel cylinder of either one of the front-left and front-right wheels and the individual linear control valve device, and the individual passage, which is located between the wheel cylinder of either one of the rear-left and rear-right wheels and the individual linear control valve device, via a front-rear communication on-off valve, wherein the front-rear communication on-off valve is a normally closed valve that keeps closed upon non-energization and is opened due to energization, and the communication control unit opens the front-wheel communication on-off valve, the rear-wheel communication on-off valve, and the front-rear communication on-off valve during the hydraulic control by the hydraulic control unit.

3. A vehicle brake control device according to claim 1, wherein the hydraulic control unit deactivates some of the individual linear control valve devices, and activates the remaining individual linear control valve devices during the normal brake control, upon controlling the hydraulic pressure of each wheel cylinder.

4. A vehicle brake control device according to claim 2, wherein the hydraulic control unit deactivates some of the individual linear control valve devices, and activates the remaining individual linear control valve devices during the normal brake control, upon controlling the hydraulic pressure of each wheel cylinder.

* * * * *